United States Patent
Diest et al.

(10) Patent No.: US 11,256,331 B1
(45) Date of Patent: Feb. 22, 2022

(54) APPARATUSES, SYSTEMS, AND METHODS INCLUDING HAPTIC AND TOUCH SENSING ELECTROACTIVE DEVICE ARRAYS

(71) Applicant: Facebook Technologies, LLC, Menlo Park, CA (US)

(72) Inventors: Kenneth Diest, Kirkland, WA (US); Andrew John Ouderkirk, Redmond, WA (US); Renate Eva Klementine Landig, Seattle, WA (US); Katherine Marie Smyth, Seattle, WA (US); Christopher Yuan Ting Liao, Seattle, WA (US); Jack Lindsay, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/431,197

(22) Filed: Jun. 4, 2019

Related U.S. Application Data

(60) Provisional application No. 62/790,548, filed on Jan. 10, 2019.

(51) Int. Cl.
*G06F 3/01* (2006.01)
(52) U.S. Cl.
CPC .................... *G06F 3/016* (2013.01)
(58) Field of Classification Search
CPC .............. G09G 5/00; G06F 3/0416; G06F 2203/04103; H01L 41/042; H01L 41/08
See application file for complete search history.

(56) References Cited

U.S. PATENT DOCUMENTS

| | | |
|---|---|---|
| 3,797,922 A | 3/1974 | Plummer |
| 5,225,244 A | 7/1993 | Aharoni et al. |
| (Continued) | | |

FOREIGN PATENT DOCUMENTS

| | | |
|---|---|---|
| WO | 2008/156166 A1 | 12/2008 |
| WO | 2010/104904 A2 | 9/2010 |
| (Continued) | | |

OTHER PUBLICATIONS

Mullin et al., "Pattern Transformation Triggered by Deformation", Physical Review Letters, vol. 99, No. 8, 2007, 4 pages.
(Continued)

*Primary Examiner* — Kevin M Nguyen
(74) *Attorney, Agent, or Firm* — FisherBroyles, LLP

(57) ABSTRACT

Embodiments of the present disclosure are generally directed to apparatuses, systems, and methods that utilize electroactive devices in connection with haptic devices (e.g., haptic touch sensors or haptic feedback elements). In some examples, a haptic feedback system may include an array of electroactive devices, each electroactive device including 1) a first electrode, 2) a second electrode, and 3) an electroactive polymer element disposed between the first electrode and the second electrode. The electroactive polymer element may include a nanovoided polymer material that is mechanically deformable in response to an electric field generated by a potential difference between the first electrode and the second electrode. The system may also include control circuitry electronically coupled to the array and configured to apply a voltage to at least one of the first electrode or the second electrode. Various other apparatuses, systems, and methods are also disclosed.

19 Claims, 14 Drawing Sheets

(56) References Cited

U.S. PATENT DOCUMENTS

| | | | |
|---|---|---|---|
| 5,663,779 | A | 9/1997 | Karasawa |
| 6,420,441 | B1 | 7/2002 | Allen et al. |
| 7,118,219 | B2 | 10/2006 | Itagaki |
| 8,210,678 | B1 | 7/2012 | Farwig |
| 10,698,224 | B1 | 6/2020 | Cooke et al. |
| 10,754,145 | B1 | 8/2020 | Ouderkirk et al. |
| 2003/0003295 | A1 | 1/2003 | Dreher et al. |
| 2003/0083433 | A1 | 5/2003 | James et al. |
| 2006/0024976 | A1 | 2/2006 | Waldfried et al. |
| 2008/0088793 | A1 | 4/2008 | Sverdrup et al. |
| 2008/0123049 | A1 | 5/2008 | Volk |
| 2008/0144185 | A1 | 6/2008 | Wang et al. |
| 2008/0170299 | A1 | 7/2008 | Kawabata |
| 2008/0171431 | A1 | 7/2008 | Yu et al. |
| 2008/0290435 | A1 | 11/2008 | Oliver et al. |
| 2008/0291394 | A1 | 11/2008 | Ishak |
| 2009/0015786 | A1 | 1/2009 | Harris |
| 2010/0075056 | A1 | 3/2010 | Axisa et al. |
| 2010/0079358 | A1* | 4/2010 | Daniel ............ G02B 26/004 345/55 |
| 2010/0202054 | A1 | 8/2010 | Niederer |
| 2010/0238400 | A1 | 9/2010 | Volk |
| 2011/0075096 | A1 | 3/2011 | Ishak et al. |
| 2011/0085131 | A1 | 4/2011 | Gupta et al. |
| 2011/0176105 | A1 | 7/2011 | Harris |
| 2011/0179861 | A1 | 7/2011 | Grange et al. |
| 2012/0029416 | A1 | 2/2012 | Parker et al. |
| 2012/0041553 | A1 | 2/2012 | Gupta et al. |
| 2012/0092775 | A1 | 4/2012 | Duston et al. |
| 2012/0105333 | A1* | 5/2012 | Maschmeyer ......... G06F 3/016 345/173 |
| 2012/0229754 | A1 | 9/2012 | Iyer et al. |
| 2013/0044049 | A1* | 2/2013 | Biggs ............... H01L 41/083 345/156 |
| 2013/0300635 | A1 | 11/2013 | White et al. |
| 2013/0307789 | A1* | 11/2013 | Karamath ........... G06F 3/016 345/173 |
| 2014/0153102 | A1 | 6/2014 | Chang |
| 2014/0300857 | A1 | 10/2014 | Cohen-Tannoudji et al. |
| 2014/0312737 | A1 | 10/2014 | Jenninger et al. |
| 2015/0116656 | A1 | 4/2015 | Stevens et al. |
| 2015/0146161 | A1 | 5/2015 | Rigato et al. |
| 2015/0323812 | A1 | 11/2015 | Ishak et al. |
| 2016/0004099 | A1 | 1/2016 | Steven et al. |
| 2016/0187985 | A1 | 6/2016 | Lim et al. |
| 2017/0045649 | A1 | 2/2017 | Bolis |
| 2017/0160600 | A1 | 6/2017 | Galstian et al. |
| 2017/0184848 | A1 | 6/2017 | Vallius |
| 2017/0192595 | A1* | 7/2017 | Choi ............... G06F 3/0416 |
| 2017/0317269 | A1 | 11/2017 | Zhang et al. |
| 2018/0093456 | A1 | 4/2018 | Van Overmeere et al. |
| 2018/0175746 | A1* | 6/2018 | Van Den Ende ..... H01L 41/053 |
| 2018/0255250 | A1 | 9/2018 | Price et al. |
| 2018/0275394 | A1 | 9/2018 | Yeoh et al. |
| 2019/0050102 | A1* | 2/2019 | Johnson ............ G06F 3/04144 |
| 2019/0243123 | A1 | 8/2019 | Bohn |
| 2019/0296218 | A1 | 9/2019 | Ouderkirk et al. |
| 2019/0302479 | A1 | 10/2019 | Smyth et al. |

FOREIGN PATENT DOCUMENTS

| | | |
|---|---|---|
| WO | 2019/183431 A1 | 9/2019 |
| WO | 2019/190887 A1 | 10/2019 |

OTHER PUBLICATIONS

Babaee et al., "3D Soft Metamaterials with Negative Poisson's ratio", Advanced Materials, vol. 25, No. 36, 2013, 18 pages.

Bertoldi et al., "Novel negative Poisson's ratio behavior induced by an elastic instability", Advanced Materials, vol. 22, No. 3, 2010, pp. 1-11.

Overvelde et al., "Relating pore shape to the non-linear response of periodic elastomeric structures", Journal of the Mechanics and Physics of Solids, vol. 64, 2014, 16 pages.

Shen et al., "Simple cubic three-dimensional auxetic metamaterials", Physic Status Solidi (B), vol. 251, No. 8, 2014, pp. 1515-1522.

Correa et al., "Negative Stiffness Honeycombs for Recoverable Shock Isolation", Rapid Prototyping Journal, vol. 21, No. 2, 2015, pp. 702-713.

Coulais et al., "Discontinuous Buckling of Wide Beams and Metabeams", Physical Review Letters, vol. 115, 2015, 7 pages.

Bickel et al., "Design and Fabrication of Materials with Desired Deformation Behavior", ACM Transactions on Graphics (TOG), vol. 29, No. 4, Jul. 2010, 10 pages.

Rosset et al., "Small, fast, and tough: Shrinking down integrated elastomer transducers", Applied Physics Reviews, vol. 3, No. 3, 2016, pp. 1-27.

Plante et al., "Large-scale failure modes of dielectric elastomer actuators", International Journal of Solids and Structures, vol. 43, 2006, pp. 7727-7751.

"Optotune DEAPs", Electroactive polymers, URL: https://www.optotune.com/technology/electroactive-polymers, 2019, 3 pages.

Product—Novasentis, "EMP Haptic Actuators for Sensory Innovation", URL: https://www.novasentis.com/product, 2019, 4 pages.

Rosset et al., "Mechanical characterization of a dielectric elastomer microactuator with ion-implanted electrodes", Sensor and Actuators A 144, 2008, 25 pages.

Gerratt et al., "Dielectric breakdown of PDMS thin films", Journal of Micromechanics and Microengineering, vol. 23, Apr. 26, 2013, 8 pages.

Hunt et al., "A self-healing dielectric elastomer actuator", Applied Physics Letters, vol. 104, 2014, 4 pages.

Skov et al., "Optimization Techniques for Improving the Performance of Silicone-Based Dielectric Elastomers", Advanced Engineering Materials, vol. 20, 2018, pp. 1-21.

Mazurek et al., "Glycerol as high-permittivity liquid filler in dielectric silicone elastomers", Journal of Applied Polymer Science, vol. 133, No. 43, 2016, 28 pages.

Rao et al., "Synthesis of flexible silica aerogels using methyltrimethoxysilane (MTMS) precursor", Journal of Colloid and Interface Science, vol. 300, 2006, pp. 279-285.

Seo et al., "Reticulated Nanoporous Polymers by Controlled Polymerization-Induced Microphase Separation", Science, vol. 336, Jun. 15, 2012, 5 pages.

Jennings, S.G., "The mean free path in air", Journal of Aerosol Science, vol. 19, No. 2, 1988, pp. 1-2.

Gupta et al., "Nanoemulsions: formation, properties and applications", Soft Matter, 2016, 16 pages.

Helgeson et al., "Mesoporous organohydrogels from thermogelling photocrosslinkable nanoemulsions", Nature Materials, vol. 11, Apr. 2012, pp. 344-352.

Guha et al., "Creating nanoscale emulsions using condensation", Nature Communications, vol. 8, No. 1371, Nov. 8, 2017, pp. 1-7.

Meier et al., "Microemulsion elastomers", Colloid Polymer Science, vol. 274, 1996, pp. 218-226.

Richter et al., "Design considerations of form birefringent microstructures", Applied Optics, vol. 34, No. 14, May 10, 1995, pp. 2421-2429.

Mahadik et al., "Elastic and Superhydrophobic Monolithic Methyltrimethyoxysilane-based Silica Aerogels by Two-step sol-gel process", Journal Microelectron, vol. 23, No. 1, 2016, pp. 35-39.

Tanaka et al., "Polymer Nanocomposites as Dielectrics and Electrical Insulation-perspectives for Processing Technologies, Material Characterization and Future Applications", IEEE Transactions on Dielectrics and Electrical Insulation, vol. 11, No. 5, Oct. 2004, pp. 763-784.

Cheng et al., "Controlled in Situ Nanocavitation in Polymeric Materials", Advanced Materials, vol. 23, Jan. 2011, pp. 409-413.

"Ultrahaptics Stratos Inspire", URL: https://www.ultrahaptics.com/wp-content/uploads/2018/10/STRATOS-Inspire-Fact-Sheet-issue-10.pdf, retrieved on Sep. 25, 2019, 2 pages.

Ouderkirk et al., "Electroactive Polymer Devices, Systems, and Methods", U.S. Appl. No. 16/059,091, filed Aug. 9, 2018, 68 pages.

Notice of Allowance received for U.S. Appl. No. 15/972,794 dated Oct. 16, 2020, 22 pages.

(56) References Cited

OTHER PUBLICATIONS

Notice of Allowance received for U.S. Appl. No. 15/992,731 dated Nov. 18, 2020, 37 pages.
Final Office Action received for U.S. Appl. No. 16/106,945 dated Nov. 24, 2020, 94 pages.
Final Office Action received for U.S. Appl. No. 16/018,752 dated Nov. 30, 2020, 41 pages.
Notice of Allowance received for U.S. Appl. No. 16/018,746 dated Nov. 3, 2020, 39 pages.
Notice of Allowance received for U.S. Appl. No. 16/021,580 dated Dec. 9, 2020, 68 pages.
John M. Cooke, et al.; Optical Lens Assemblies, Head-Mounted Displays, and Related Methods; U.S. Appl. No. 16/021,580, filed Jun. 28, 2018.
Andrew John Ouderkirk, et al.; Electroactive Polymer Devices, Systems, and Methods; U.S. Appl. No. 16/035,562, filed Jul. 13, 2018.
"Adjustable Reading Glasses," Retrieved from internet URL: https://adlens.com/.
International Preliminary Report on Patentability received for PCT Application Serial No. PCT/US2019/023485 dated Oct. 8, 2020, 8 pages.
Merriam-Webster, "Porosity", URL: https://www.merriam-webster.com/dictionary/porosity, retrieved on Apr. 8, 2020, pp. 1-8.
International Search Report and Written Opinion received for PCT Application Serial No. PCT/US2019/023484 dated Jul. 3, 2019, 9 pages.
Non-Final Office Action received for U.S. Appl. No. 16/059,091 dated Apr. 8, 2020, 54 pages.
Final Office Action received for U.S. Appl. No. 16/059,091 dated Sep. 21, 2020, 18 pages.
Non-Final Office Action received for U.S. Appl. No. 16/013,837 dated Jan. 23, 2020, 22 pages.
Notice of Allowance received for U.S. Appl. No. 16/013,837 dated Apr. 14, 2020, 14 pages.
Preinterview First Office Action received for U.S. Appl. No. 15/992,731 dated Sep. 27, 2019, 17 pages.
Final Office Action received for U.S. Appl. No. 15/992,731 dated Jun. 2, 2020, 25 pages.
Non-Final Office Action received for U.S. Appl. No. 15/992,731 dated Aug. 24, 2020, 27 pages.
Examiner-Initiated Interview Summary received for U.S. Appl. No. 16/008,635 dated Apr. 20, 2020, 3 pages.
Notice of Allowance received for U.S. Appl. No. 16/008,635 dated May 4, 2020, 32 pages.
International Preliminary Report on Patentability received for PCT Application Serial No. PCT/US2019/023484 dated Oct. 1, 2020, 8 pages.
International Search Report and Written Opinion received for PCT Application Serial No. PCT/US2019/023485 dated Jul. 4, 2019, 11 pages.
Non-Final Office Action received for U.S. Appl. No. 16/106,945 dated Apr. 16, 2020, 59 pages.
Non-Final Office Action received for U.S. Appl. No. 16/041,634 dated Jul. 30, 2020, 24 pages.
Notice of Allowance received for U.S. Appl. No. 16/041,634 dated Aug. 28, 2020, 31 pages.
Preinterview First Office Action received for U.S. Appl. No. 16/018,752 dated Dec. 16, 2019, 19 pages.
Preinterview First Office Action received for U.S. Appl. No. 16/018,746 dated Jul. 14, 2020, 20 pages.
Notice of Allowance Action received for U.S. Appl. No. 16/018,746 dated Sep. 17, 2020, 24 pages.
Preinterview First Office Action received for U.S. Appl. No. 16/021,580 dated Aug. 4, 2020, 48 pages.
Press Kit Home, "Adaptive glasses", accessed at http://tvc.utah.edu, as accessed on Mar. 13, 2018, 5 pages.
Billah et al., "Microstructure Evolution and Electrical Characterization of Lanthanum doped Barium Titanate (BaTi03) Ceramics", International Conference on Mechanical Engineering, AIP Cont. Proc. 1754, accessed on Jul. 12, 2016, pp. 030006-1-030006-7.
Cao et al., Grain Size and Domain Size Relations in Bulk Ceramic Ferroelectric Materials, J. Phys. Chem Solids vol. 57, No. 10, pp. 1499-1505, 1996.
Ding et al., "Surface profiling of an aspherical liquid lens with a varied thickness membrane," Optics Express 3122-3132, vol. 25, No. 4 (Feb. 6, 2017).
He et al., Linear Electro-Optic Properties of Orthorhombic PZN-8%PT Single Crystal, IEEE Transactions on Ultrasonics, Ferroelectrics, and Frequency Control, vol. 58, No. 6 (Jun. 1, 2011).
Knapp et al., "Understanding Zirconia Crown Esthetics and Optical Properties" Inclusive magazine accessed at http://glidewelldental.com/education/inclusive-dental-implant-magazine-volume-2-issue-4/, as accessed on Jun. 12, 2018, vol. 2, Issue 4, 17 pages.
Optotune, "Focus tunable lenses", accessed at http://www.optotune.com/technology/focus-tunable-lenses, accessed on Mar. 13, 2018, 2 pages.
Polight, "How does it work", accessed at http://www.polight.com/technology-and-products/how-does-it-work/default.aspx, accessed on Mar. 13, 2018, 3 pages.
Uzoom Adlens, "Adjustable Lens Glasses: How They Work", accessed at https://adlens.com/how-it-works/, accessed on Mar. 28, 2018, 9 pages.
Piezo Technology, "Highly Reliable Multilayer Piezo Actuators", accessed on https://www.piceramic.com/en/piezo-technology/picma/, accessed on Mar. 14, 2018, 8 pages.
Piezo Technology, "Displacement Modes of Piezoelectric Actuators", accessed on https://www.piceramic.com/en/piezo-technology/properties-piezo-actuators/displacement-modes/, accessed on Mar. 14, 2018, 12 pages.
Jiang et al., "Transparent Electro-Optic Ceramics and Devices", Proceedings vol. 5644, Optoelectronic devices and integration, accessed at https://doi.org/10.1117/12.582105, Jan. 17, 2005, 15 Pages.
Keplinger et al., "Stretchable, Transparent, Ionic Conductors", Science Magazine, vol. 341, DOI:10.1126/science.1240228, Accessed on Aug. 30, 2013, pp. 984-987.
Kong et al., "Transparent Ceramic Materials", Transparent Ceramics, Topics in Mining, Metallurgy, and Materials Engineering, Ch. 2, DOI: 10.1007/978-3-319-18956-7_2, Springer international Publishing Switzerland 2015, pp. 29-91.
Patra et al., "Comparison on Optical Properties of Pure and Doped Lithium Tetraborate Single Crystals and Glasses", Solid State Physics: Proceedings of the 56th DAE Solid State Physics Symposium 2011, AIP Conf. Proc. 1447, Dec. 11, 2012, pp. 1335-1336.
Riegler et al., "Index Matching Silicone for High Brightness LED Packaging", IMAPS International Conference on Device Packaging Mar. 13-16, Scottsdale AZ., Accessed on Mar. 18, 2005, 17 Pages.
Shian et al., Tunable Lenses using Transparent Dielectric Elastomer Actuators, Optics Express, vol. 21, No. 7 (Apr. 2, 2013).
Hocking, L.M., "The effect of slip on the motion of a sphere close to a wall and of two adjacent spheres", Journal of Engineering Math., vol. 7 (1973), pp. 207-221.
Wang et al., "A Highly Stretchable, Transparent, and Conductive Polymer", Science Advances vol. 3, No. 3, e1602076, Mar. 10, 2017, pp. 1-10.
APC International, Lid., "Piezoelectric Materials, New Materials, Piezo theory", accessed at www.americanpiezo.com/knowledge-center/piezo-theory/new-materials/html, accessed on Mar. 15, 2018, 1 page.
Zhao et al., "Spherical aberration free liquid-filled tunable lens with variable thickness membrane," Optics Express vol. 23, No. 16, accessed at https://doi.org/10.1364/0.23.021264, accessed on Aug. 5, 2015, pp. 21264-21278.
Andrew J. Ouderkirk, et al.; Apparatuses, Systems, and Methods for Adjusting Fluid Lenses; U.S. Appl. No. 16/008,635, filed Jun. 14, 2018.
Katherine Marie Smyth, et al.; Optical Lens Assemblies, Head-Mounted Displays, and Related Methods; U.S. Appl. No. 16/021,650, filed Jun. 28, 2018.
Andrew John Ouderkirk, et al.; Multi-Element Prescription Lenses With Eye-Tracking; U.S. Appl. No. 16/041,634, filed Jul. 20, 2018.

(56) References Cited

OTHER PUBLICATIONS

Andrew John Ouderkirk, et al.; Electroactive Polymer Devices And Nanovoided Polymer Materials and Methods and Systems for Fabrication Thereof; U.S. Appl. No. 16/106,945, filed Aug. 21, 2018.
Andrew John Ouderkirk, et al.; Nanovoided Electroactive Polymer Devices, Systems, and Methods; U.S. Appl. No. 16/041,858, filed Jul. 23, 2018.
Andrew John Ouderkirk, et al.; Electroactive Polymer Devices, Systems, and Methods; U.S. Appl. No. 16/059,091, filed Aug. 9, 2018.
Andrew John Ouderkirk, et al.; Optical Devices, Systems, and Methods of Manufacturing; U.S. Appl. No. 62/646,900, filed Mar. 22, 2018.
Andrew John Ouderkirk, et al.; Optical Devices, Systems, and Methods of Manufacturing; U.S. Appl. No. 62/650,254, filed Mar. 29, 2018.
Katherine Marie Smyth, et al.; Optical Lens Assemblies and Related Methods; U.S. Appl. No. 16/018,746, filed Jun. 26, 2018.
Katherine Marie Smyth, et al.; Systems and Methods for Actuation of Asymmetric Optical Elements; U.S. Appl. No. 15/992,731, filed May 30, 2018.
Andrew John Ouderkirk, et al.; Optical Lens Assemblies and Related Methods; U.S. Appl. No. 16/018,752, filed Jun. 26, 2018.
John M. Cooke, et al.; Optical Lens Assemblies, Head-Mounted Displays, and Methods of Altering Optical Properties of Optical Lens Assemblies; U.S. Appl. No. 16/013,837, filed Jun. 20, 2018.
Katherine Marie Smyth, et al.; Optical Lens Assemblies, Head-Mounted Displays, and Related Methods; U.S. Appl. No. 16/016,428, filed Jun. 22, 2018.
U.S. Appl. No. 16/035,562, filed Jul. 13, 2018.
U.S. Appl. No. 15/972,794, filed May 7, 2018.
U.S. Appl. No. 16/106,945, filed Aug. 21, 2018.
U.S. Appl. No. 16/059,091, filed Aug. 9, 2018.

* cited by examiner

APPARATUSES, SYSTEMS, AND METHODS INCLUDING HAPTIC AND TOUCH SENSING ELECTROACTIVE DEVICE ARRAYS

CROSS-REFERENCE TO RELATED APPLICATION

This application claims the benefit of priority under 35 U.S.C. § 119(e) of U.S. Provisional Application No. 62/790,548, filed Jan. 10, 2019, the contents of which are incorporated herein by reference in their entirety.

BACKGROUND

Touch sensors and touch screen displays are commonly used with an increasing variety of devices, such as smart phones, tablet computers, smart watches, car displays, navigation devices, automated teller machines (ATMs), medical equipment and factory equipment. Such sensors and displays may allow a user to reduce or eliminate the use of other physical input components, such as a mouse, keyboard, or touchpad, while enabling a diverse range of interactions with on-screen content. Conventional touch screen displays and sensors often utilize a wiring array that senses contact from a user's finger or stylus based on electric field distortions measured as changes in capacitance or based on electrical contact between separated electrodes induced by a pressing force from the finger or stylus.

However, these and other applications may be limited in various respects. For example, conventional touch screen displays typically rely on separate systems to provide each of touch sensing, force or intensity touch sensing, and haptic feedback modalities. These separate functionalities may be physically distributed in different layers of the touch displays, thus adding to the overall form factor of the displays and imposing limitations on fabrication yield, mechanical flexibility, spatial resolution, signal-to-noise ratio, and power performance of the devices. Additionally, because touch screen displays commonly have smooth surface regions configured for touch sensing, users may need to look at the displays immediately before and/or during use in order to accurately register touch input. Accordingly, there is a desire to improve such devices, along with improvements to systems and methods using such devices.

SUMMARY

As will be described in greater detail below, the instant disclosure describes electroactive devices including nanovoided electroactive materials that may be used in connection with interactive touch devices, including touch sensor and/or haptic feedback devices. In various embodiments, a haptic feedback system is described. The haptic system may include an array of electroactive devices, each electroactive device including 1) a first electrode, 2) a second electrode, and 3) an electroactive polymer element disposed between the first electrode and the second electrode. The electroactive polymer element may include a nanovoided polymer material that is mechanically deformable in response to an electric field generated by a potential difference between the first electrode and the second electrode. The system may also include control circuitry electronically coupled to the array, the control circuitry configured to apply a voltage to at least one of the first electrode or the second electrode.

In some embodiments, a deformation of the electroactive polymer element by an external force may produce a change in at least one parameter between the first electrode and the second electrode. The at least one parameter may include, for example, at least one of a resistance, a capacitance, or an inductance. In this example, the control circuitry may be configured to detect the change in the at least one parameter. Each electroactive device of the array may be configured to operate as at least one of a touch sensor element or a haptic feedback element. In various examples, at least one electroactive device of the array may include between about 1 and about 10,000 additional electroactive polymer elements overlapping the electroactive polymer element. Each of the additional electroactive polymer elements may be disposed between a pair of overlapping electrodes.

According to at least one embodiment, the control circuitry may be configured to apply the voltage to the electroactive devices of the array based on at least one of a time-domain multiplexing technique, a frequency-domain multiplexing technique, or a code-division multiplexing technique. The nanovoided polymer material may include an elastomeric polymer. In various embodiments, the electroactive polymer element may be a contiguous sheet. In this example, the first electrode may include a first electrode line of a plurality of first electrode lines coupled to one side of the electroactive polymer element and the second electrode may include a second electrode line of a plurality of second electrode lines coupled to an opposing side of the electroactive polymer element. The plurality of second electrode lines may be perpendicular to the plurality of first electrode lines.

In at least one embodiment, the first electrode or the second electrode may include at least one of a metal, a metal mesh, metal nanowires, carbon nanotubes, transparent conducting oxides, conductive polymers, or graphene. At least one electroactive device of the array may have an area between about 0.25 square micrometers and about 225 square centimeters and a spacing between at least two electroactive devices of the array may be between about 0.5 micrometers and about 15 centimeters. In certain examples, the system may include a flexible material covering at least a portion of the array, the flexible material including at least one of a glass or a polymer. The system may also include a divider material disposed between at least two electroactive devices of the array, the divider material including at least one of an enclosed gas, a polymer, an aerogel, or an encapsulant.

According to some embodiments, at least a portion of the array may overlap a display area of a display, the display including at least one of a liquid crystal display, a light-emitting diode display, a micro-light-emitting diode display, an organic light-emitting diode display, or a liquid crystal on silicon display. In one example, the mechanical deformation of the nanovoided polymer material may include compression or expansion of the nanovoided polymer material.

A touch sensor system is also described. The touch sensor system may include an array of electroactive devices. Each electroactive device of the array may include 1) a first electrode, 2) a second electrode, and 3) an electroactive polymer element disposed between the first electrode and the second electrode. The electroactive polymer element may include a nanovoided polymer material that is deformable in response to application of an external force so as to produce a change in at least one parameter between the first electrode and the second electrode. The system may also include control circuitry electronically coupled to the array, the control circuitry configured to 1) apply a voltage to at least one of the first electrode or the second electrode and 2) detect the change in the at least one parameter between the first electrode and the second electrode.

In at least one embodiment, the electroactive polymer element may also be mechanically deformable in response to an electric field generated by a potential difference between the first electrode and the second electrode. In some examples, the system may include a flexible material covering at least a portion of the array. The external force may be applied to the electroactive polymer element via the flexible material. According to various examples, at least one electroactive device of the array may include between about 1 and about 10,000 additional electroactive polymer elements overlapping the electroactive polymer element and each of the additional electroactive polymer elements may be disposed between a pair of overlapping electrodes.

A corresponding method is described. The method may include applying voltages to an array of electroactive devices, each electroactive device including 1) a first electrode, 2) a second electrode, and 3) an electroactive polymer element disposed between the first electrode and the second electrode, the electroactive polymer element including a nanovoided polymer material. The method may also include 1) detecting a change in at least one parameter between the first electrode and the second electrode of each of a set of one or more electroactive devices of the array, and 2) determining that the set of one or more electroactive devices has been deformed by an external force based on the detected change in the at least one parameter.

In some embodiments, the method may further include increasing a potential difference between the first electrode and the second electrode of each of an additional set of one or more electroactive devices of the array so as to mechanically deform the electroactive polymer element in each of the additional set of one or more electroactive devices. In one example, the application of the electric current or the voltage may include applying the electric current or the voltage in an active mode of operation, the active mode of operation including at least one of a time-domain multiplexing technique, a frequency-domain multiplexing technique, or a code-division multiplexing technique.

Features from any of the these or other embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

DETAILED DESCRIPTION

Figure 1A:
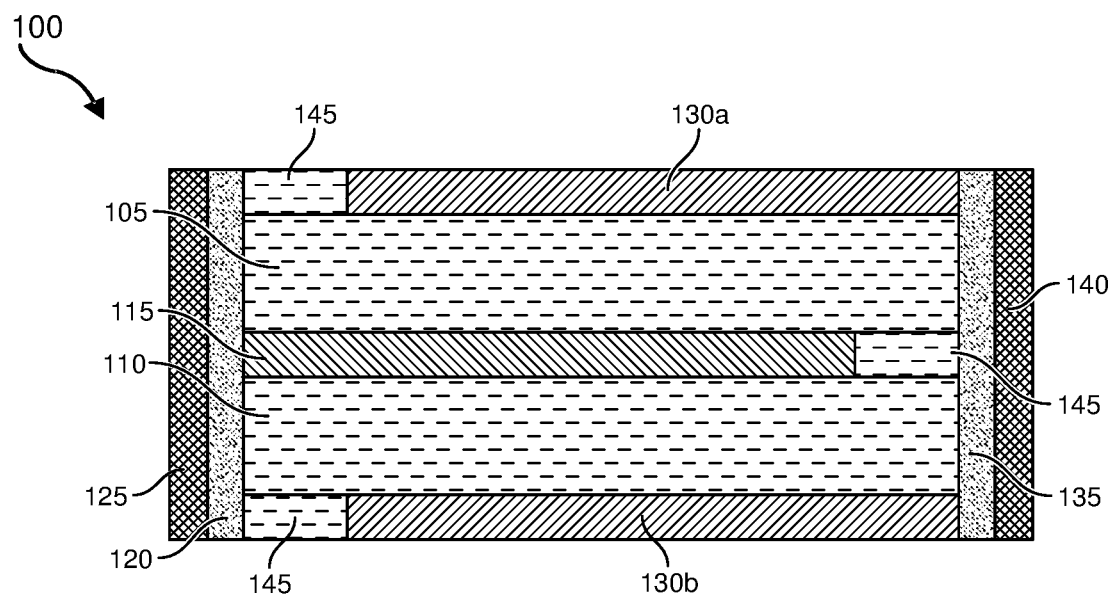
FIG. 1A illustrates an exemplary electroactive device in connection with embodiments of this disclosure.

Embodiments of the present disclosure are described herein. It is to be understood, however, that the disclosed embodiments are merely examples and other embodiments can take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, may be desired for particular applications or implementations.

As noted, touch sensors and touch screen displays may represent technologies that may be integrated into numerous electronic devices and may serve as methods of interfacing with the electronic devices. For instance, electronic devices may include ultrasonic sensing systems that may be used in conjunction with displays to sense hand movements above a touch screen. Accordingly, pre-programmed hand movements may be recorded and inputted into the device rather than requiring the user to touch the display, allowing a user to keep their eyes elsewhere (e.g., focused on features of the user's environment, such as a road). However, the amount of information that can be inputted to the device may be limited, in part, due to the limited set of pre-programmed hand gestures. In other examples, touch screens may include tunable surface texturing. However, the tunable texturing may be configured to work with mechanical switching (e.g., switching when a screen is pressed by the user's finger) that may require rigid-substrate and/or flat-substrate implementations.

Embodiments of the present disclosure are generally directed to touch-display systems that include electroactive devices (e.g., transducers, actuators, and/or sensors) having electroactive elements, such as nanovoided polymer (NVP) elements. The disclosed systems and devices may enable combinations of positional touch sensing, force and/or intensity touch sensing, and/or haptic feedback. Further, in contrast to conventional systems, the disclosed systems and devices may allow such sensing and haptic modes to be integrated into a single functional layer, panel, or region of an electroactive device.

In some embodiments, a device may include an array of electroactive devices. In at least one example, each electroactive device may include stacks of electrodes alternating with electroactive elements (e.g., NVP elements). The electrodes may be connected by schoopage (i.e., contact) layers in a variety of configurations, to be described below. An electric field may be applied between the electrodes, resulting in compression or expansion of the stacks of electroactive elements. Additionally, mechanical deformation of the stacks (e.g., compression by a user's finger) may be sensed by a change in a corresponding device parameter (e.g., a resistance, a capacitance, an inductance, and/or the like).

In some examples, the height of individual sub-components of the system may be configured, for example, to provide texturing of a touch screen surface. This may facilitate the use of the device without the need for a user to gaze at the device prior to and/or during use. For example, a user may input commands to the device without the need for visually determining the location of input buttons, similar to certain Braille systems. Further, a plurality of electroactive devices may be arrayed in front of or behind a display, such as a liquid crystal display (LCD), a light-emitting diode (LED) display, a micro-light-emitting diode (microLED) display, an organic light-emitting diode (OLED) display, a liquid crystal on silicon (LCOS) display, and/or the like. This may allow for user interaction with the display via touch and/or haptic feedback. In various examples, arrays of electroactive devices providing touch sensing and/or haptic feedback may be disposed on non-display regions (e.g., surfaces of an automobile or workspace that are convenient for user interaction).

In various embodiments, electroactive devices may include paired electrodes. The paired electrodes may create an electrostatic field that forces deformation (e.g., constriction or expansion) of electroactive elements including electroactive polymers (e.g., NVPs). Such electrodes may include relatively thin, electrically conductive layers or elements which may have a non-compliant or compliant nature. Any suitable materials may be used as the electrodes, including electrically conductive materials suitable for use in thin-film electrodes. Non-limiting examples may include transparent conducting oxides (TCOs), metals (e.g., aluminum, silver, indium, gallium, zinc, and/or other suitable metals), carbon nanotubes, carbon black, graphene (e.g., graphene composites), conducting polymers, such as poly (3,4-ethylenedioxythiophene) (PEDOT) polymers or composites (e.g., poly[3,4-ethylenedioxythiophene] polystyrene sulfonate [PEDOT:PSS], poly[3,4-ethylenedioxythiophene]-tetra methacrylate [PEDOT-TMA], and/or other suitable PEDOT materials), and/or any other suitable conductive materials. Such electrodes may be formed by physical vapor deposition (PVD) chemical vapor deposition (CVD), atomic layer deposition (ALD), spin-coating, spray-coating, adhesion, printing (e.g., inkjet printing), extrusion, and/or any other suitable technique either on a non-electroactive material layer or directly on the electroactive element surface itself. The electrode or electrode layer may be self-healing, such that damage from local shorting of a circuit can be isolated. Suitable self-healing electrodes may include thin films of metals, such as, for example, aluminum.

In some embodiments, an electroactive device may include a stack of one or more electroactive polymer elements (e.g., NVP elements, such as elastomeric NVP elements) that are layered, with electrodes abutting opposing surfaces of each of the electroactive polymer elements. In some embodiments, the electroactive polymer elements may be driven by adjacent pairs of electrodes. As described below, electrodes may be electrically connected to at least one adjacent common electrode extending along a lateral periphery of the stack via at least one schoopage (i.e., contact) layer.

In some embodiments, the electroactive elements (e.g., the NVP layers) of an electroactive device may include one or more relatively large and/or contiguous sheets disposed between an array of electrode lines. The individual electroactive devices serving as actuation and sensing elements in the array may be addressable by the array of electrode lines, which may be disposed above and below the electroactive elements (e.g., a multi-layer stack of NVP layers). The array of electrode lines sandwiching the electroactive elements may include two arrays of parallel electrode lines. In some embodiments, the electrode lines above the multi-layer stack may be the rotated (e.g., about 90-degrees or any suitable amount) with respect to the electrode lines below the electroactive materials.

An array may include vertical column electrodes, an electroactive element including an NVP, and horizontal row electrodes disposed on a side of the electroactive element opposite the vertical column electrodes, or any other suitable configuration. Methods of using electroactive device arrays are also described. In one example, a method may include electronically sweeping through each column and row combination of an array sequentially in time. Further, at each time step, a signal (e.g., a resistance, a capacitance, and/or an inductance of the array elements) may be measured and a signal may be outputted to the array elements (e.g., to drive the array elements).

In at least one embodiment, devices including haptic feedback elements may be used to provide force feedback that would be felt by portions of a user's body in various real-world and/or virtual operations. A "haptic feedback element" (i.e., an "HFE"), as used herein, may refer to a component, such as an electroactive device (e.g., a transducer and/or an actuator) as described herein, that, when activated, produces a haptic feedback response that may be experienced by a user as a touch-based sensation. The haptic feedback response produced by an HFE may include, for example, an applied force, vibration, and/or motion. In some examples, an HFE may be a single component of a group of haptic components, such as an array of HFEs. As described herein, multiple HFEs may be arranged in a single plane or layer. In some examples, two or more HFEs or layers of HFEs may be stacked on top of each other in an overlapping manner so as to, for example, provide a greater overall degree of displacement from the combined displacements of each of the multiple stacked HFEs. Additionally or alternatively, a stack of electroactive devices may provide both touch sensor and haptic feedback functionalities, with a first electroactive device utilized to detect force applied to the stack by a user and a second electroactive device acting as an HFE to provide a haptic feedback response to the user.

Embodiments of the present disclosure may find application in tactile electronic displays (e.g., display devices that present information in tactile form). In some embodiments, the disclosed systems may find application in simulators (e.g., medical simulators, remotely controlled vehicle interfaces, and flight simulators). The electroactive devices described herein may also find application in displays for a variety of user devices (e.g., a mobile phone, tablet, smart watch, laptops, and/or the like). In particular, such user devices may offer displays that may be configured to provide haptic feedback to a user. For example, the disclosed devices may enable a user to control in-plane forces experienced by a portion of the user's hand (e.g., a fingertip), as a function of the motion of the portion of the user's hand. Further, a given electroactive device in a tactile display may be used to generate a feedback vibration, while another electroactive device may create another vibration to suppress the feedback vibration from propagating to unwanted regions of the device. This can serve to spatially localize the haptic feedback.

Embodiments of the present disclosure may improve user interactions in artificial reality systems. For example, the disclosed systems may be used in body or torso-based haptic clothing (e.g., vests, suits, or gloves) that may be used in immersive VR applications. The disclosed systems may also be used in gloves that may serve as input devices for enabling human-computer interaction.

The disclosed systems may include electroactive device arrays fabricated on flexible substrates that may be used to coat objects to provide for user interaction with the objects. For example, the devices may be coated on a surface of a steering wheel of a vehicle to provide real-time feedback to a driver. The feedback may, for example, be based on road conditions, navigation instructions, and/or the like.

Further, an electroactive device array may be used as any suitable device, including, but not limited to, a virtual keyboard, a fingerprint scanner, and/or the like. The electroactive device array may be configured to be a standalone system or, as noted, may be integrated into another device, such as a display screen.

FIG. 1A illustrates an exemplary electroactive device that may serve as a touch sensor and/or haptic actuator in accordance with example embodiments of the disclosure. In particular, electroactive device 100 may include a stack of electroactive elements, such as electroactive polymer elements 105 and 110, and a first electrode 115. The first electrode 115 may be optionally connected through a first schoopage layer 120 to a first common electrode 125. A second set of electrodes 130a and 130b may be connected to a second optional schoopage layer 135, which may be connected to a second common electrode 140. Further, the first electrode 115 may be isolated from the second set of electrodes 130a and 130b with an insulator 145. The insulator 145 may include an electroactive polymer and/or NVP, which may be act as a dielectric, or may include a different insulating material (e.g., an acrylate or a silicone polymer).

The first common electrode 125 and/or the second common electrode 140 may be structured in a number of different ways than shown in FIG. 1A. For example, the first common electrode 125 and/or the second common electrode 140 may form any suitable shape such as a sloped shape or an irregular shape, for example, to allow for compression and expansion of the electroactive polymer elements 105 and/or 110. Additionally, while electroactive device 100 is shown as a stacked device having multiple layered electroactive polymer elements (i.e., electroactive polymer elements 105 and 110) disposed between alternating layered electrodes that are connected to corresponding common electrodes, electroactive devices disclosed herein may have any suitable configuration suited to the respective embodiments. For example, an electroactive device may have an electroactive polymer element disposed in a single layer positioned between a pair of abutting electrodes. In such a configuration, the adjacent electrodes may not be electrically coupled to a schoopage layer and/or a common electrode. In additional examples, an electroactive device may have a greater number of stacked electroactive elements than shown in FIG. 1A, with the electroactive elements disposed between alternating layered electrodes that are electrically coupled to respective common electrodes in a manner similar to that illustrated in FIG. 1A or any other suitable manner. In various examples, an electroactive device may include any suitable number of stacked electroactive elements, such as from about 1 to about 10,000 overlapping elements.

Figure 2A:
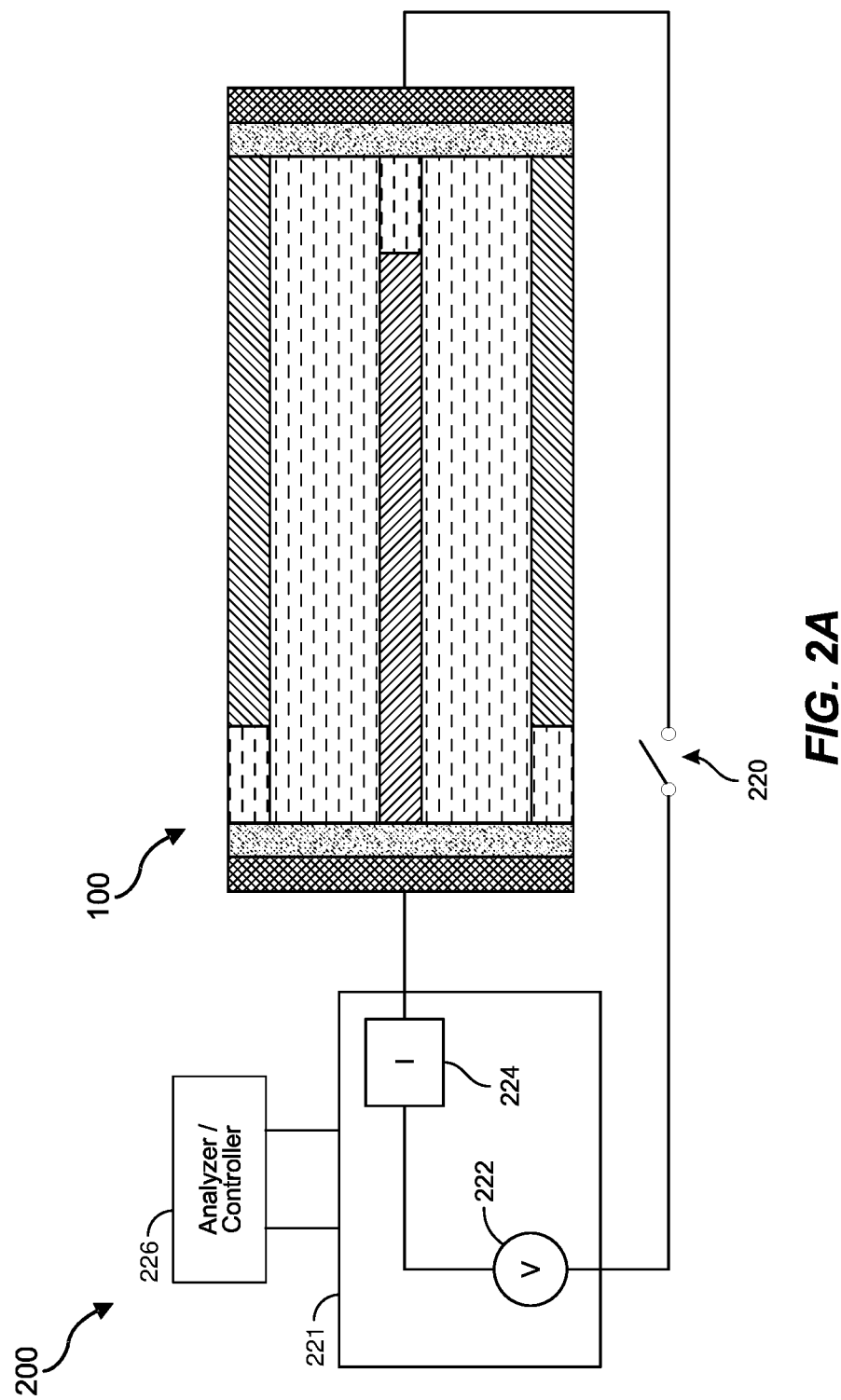
FIG. 2A illustrates an exemplary system including an electroactive device in accordance with embodiments of the present disclosure.
Figure 2B:
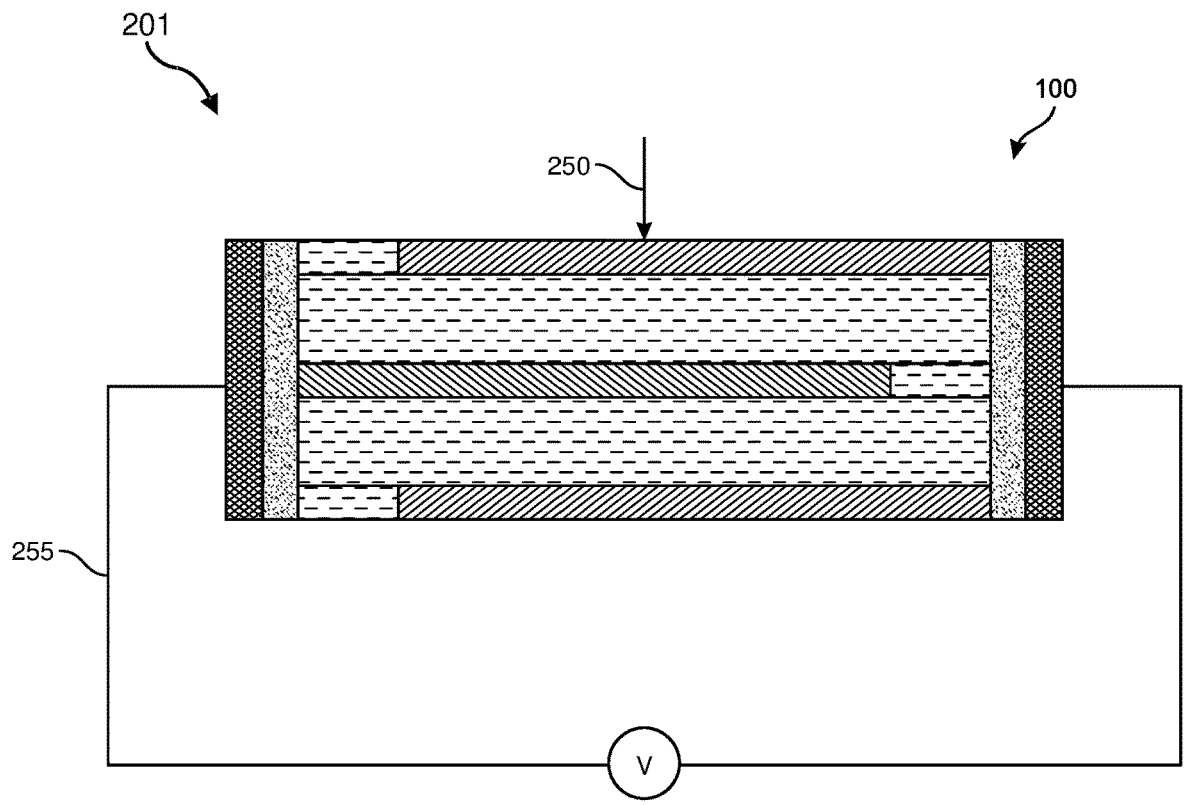
FIG. 2B illustrates the exemplary electroactive device of FIG. 2A receiving touch input in accordance with embodiments of the present disclosure.

In some embodiments, the application of an applied force on the electroactive device 100 may lead to electroactive polymer elements 105 and/or 110 being compressed and resulting in at least a portion of two or more electrodes being brought into closer proximity with each other (see, e.g., FIG. 2B). The electroactive polymer elements 105 and/or 110 of electroactive device 100 may be subsequently expanded upon removal of the applied force. Additionally or alternatively, the electroactive polymer elements 105 and/or 110 may be contracted and/or expanded by the application of an applied voltage or current to the electrodes, as described further below. Compression or expansion of the electroactive device 100, and/or at least a portion thereof, can be measured by any suitable measurement device (e.g., analyzer/controller 226 shown and described in connection with FIG. 2, below). For example, the disclosed systems may determine a compression or expansion of electroactive polymer elements 105 and/or 110 of electroactive device 100 by measuring a change in the capacitance (in addition to a resistance, an inductance, and/or the like) across the electrodes. In some examples, the measurement device may include a circuit that is connected to two or more of the electrodes of the electroactive device 100. In some embodiments, changes in capacitance may additionally or alternatively be correlated to bending of the electroactive device and/or lateral displacement of electrodes of the electroactive device with respect to each other.

The electroactive device 100 may be used as a capacitive sensor to detect or measure in-plane or out-of-plane force displacements with respect to the electroactive device 100. Multiple electroactive devices may be configured in an array (as shown and described in connection with FIGS. 5A-6B, below) and may be used to detect or measure in-plane or out-of-plane force displacements with respect to portions of the array. The electroactive device array configuration may include a bending actuator, a roll-actuator, or a stack actuator, and/or the like. The dimensions of the electroactive device (e.g., from a top-down view) may be between about 0.5 um by about 0.5 um to about 15 cm by about 15 cm. The number of stacked electroactive polymer element layers in the electroactive device may be between 1 and 10,000 layers.

Figure 1B:
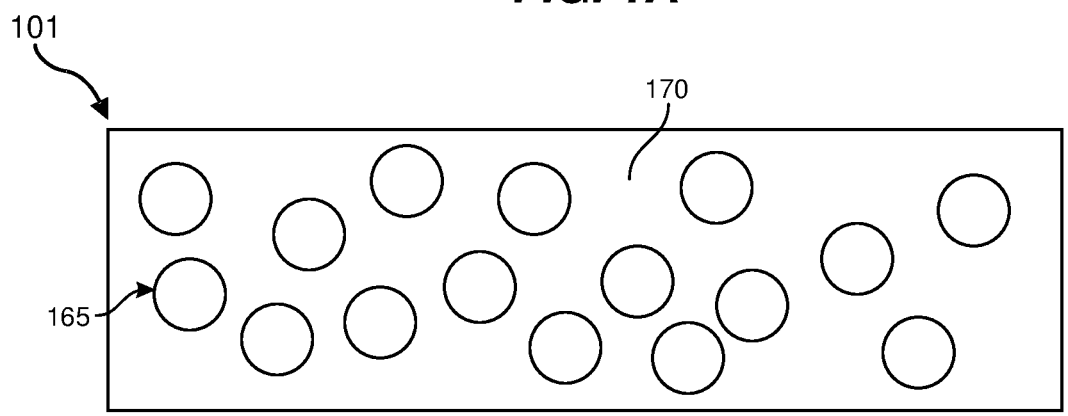
FIG. 1B shows diagrams illustrating exemplary aspects of the formation of nanovoids in a material (e.g., a polymer) in connection with embodiments of this disclosure.
Figure 1B:
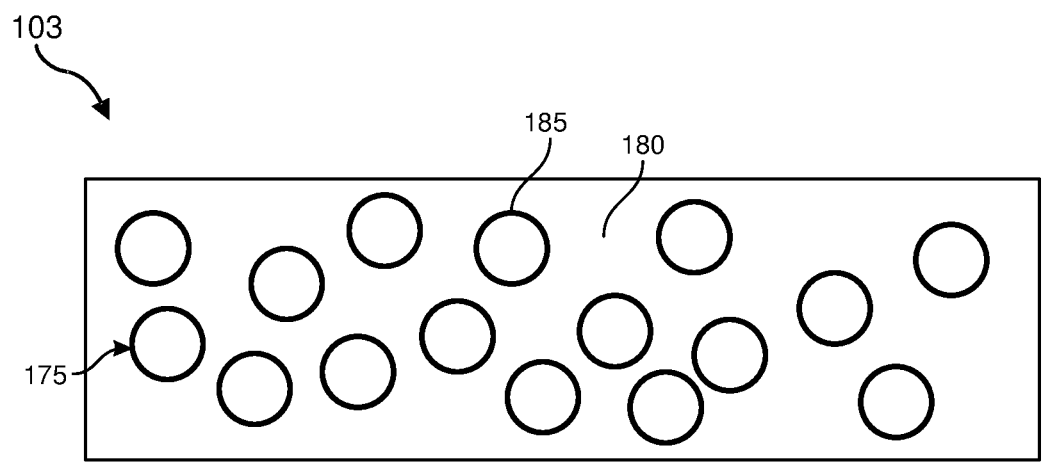

The electroactive polymer elements may include compressible NVP materials. Such NVP materials may have any suitable configuration and may be formed using any suitable materials and any suitable process, including those described herein, without limitation. FIG. 1B shows aspects of the formation of such nanovoids in a material (e.g., a polymer), in accordance with example embodiments of the disclosure. In particular, diagram 101 illustrates aspects of the formation of nanovoids in a material 170 (e.g., a polymer). In some embodiments, a polymer material precursor, such as a mixture including a monomer, may be deposited with a solvent, and the monomer and solvent may be cured, leading to the separation of the solvent and the formation of nanovoids 165 in the material 170.

Diagram 103 illustrates aspects of a nanovoided material 180 formed using, for example, a B-stage polymer (also referred to as B-stage epoxy or partially cured epoxy and/or polymer) for the formation of nanovoids 175, where the nanovoids may be coated, as will be described. In particular, diagram 103 illustrates aspects of the formation of nanovoids in a first polymer material 180. To form the nanovoids 175 in the first polymer material 180, two or more monomers may be mixed. Further, a first monomer may be cured by a first source of radiation (e.g., UV light), while another monomer may be cured by a second source of radiation (e.g., heat or x-rays). Further, when the first monomer is cured to form the first polymer material 180, the polymer may exclude the second monomer along with the solvent and thereby form nanovoids 175, which may include solvent and/or the second monomer internally.

As noted, multiple different sources of radiation may be used to generate the nanovoided material shown in diagram 103 for B-stage epoxies. In an example system, a first monomer may include a free-radical initiated monomer which may be activated (e.g., polymerized) by UV light, while a second monomer may include a different monomer type such as an epoxy, that is unaffected by the first type of radiation (e.g., UV light). Moreover, the second monomer may be cured by a second type of radiation, such as heat. Accordingly, when the first monomer, second monomer, and solvent are mixed, the first monomer and second monomer may both dissolve in the solvent. The mixture may then be irradiated with a first type of radiation (e.g., UV light) such that the first monomer begins to polymerize and form the first polymer material 180. The solvent and the second monomer regions that surround the polymerizing first monomer may be excluded from polymerizing first monomer, leading to the formation of partially formed nanovoids. Further, excluded regions that include the solvent and second monomer may remain inside the partially formed nanovoids. When heat is subsequently applied to the partially formed nanovoids, the solvent may evaporate and the second monomer may coat the inside of the partially formed nanovoids, leading to the formation of the nanovoids 175. Accordingly, the nanovoids 175 may not move; rather the material (e.g., the second monomer and/or solvent) in the partially formed nanovoids may evaporate and the second monomer and/or the solvent may coat the interiors of the nanovoids 175. The second monomer (e.g., an epoxy) may then be polymerized to form layers of a second polymer material 185 coating the interiors of the nanovoids 175 defined in the first polymer material 180.

Moreover, because the different polymers (e.g., the first polymer material 180 and the second polymer material 185) respectively formed from the first and second monomers may have different indices of refraction and/or different mechanical properties, more sophisticated nanovoided materials may be formed using the B-stage epoxies and associated processes. For example, it may be possible to generate nanovoided materials that have switchable reflectivity without the need to completely compress the nanovoids 175 to generate the switching effect with high efficiency. This may be done by keeping the nanovoids 175 from fully collapsing at least in part due to different mechanical properties of the nanovoids 175, or of a polymer (e.g., the second polymer material 185) coating the interior surfaces of the nanovoids 175, as compared with the polymer matrix (e.g., the first polymer material 180) in which they are formed.

In some embodiments, the nanovoids (e.g., nanovoids 165 and/or 175) may contain a compressible fluid (e.g., air). In another embodiment, once the solvent separates from the curable material to form the nanovoids during the fabrication of the nanovoided material, the nanovoided material may be dried and the solvent may be replaced by a compressible fluid (e.g., air). In another embodiment, when pressure is applied to the nanovoided materials, the voids may not be fully eliminated as there may still be compressed fluid (e.g., air) in the voids. In another embodiment, the voids may be further reduced in volume by compression; for example, by forming nanovoids that have an open-cell structure. Accordingly, the compressible fluid may be able to at least partially diffuse into the compressed matrix upon compression of the nanovoided material.

FIG. 2A illustrates an exemplary system including an electroactive device generating a haptic output. As shown in diagram 200, the electroactive device 100 may be coupled to and driven by a power source 221. The power source 221 may include a voltage source 222 and a current source 224 and may be connected to the electroactive device 100 via a switch 220. The voltage source 222 may refer to a two-terminal device which may maintain a fixed voltage in an electronic circuit shown in diagram 200. The current source 224 may refer to a two-terminal device which may deliver an electric current to the electroactive device 100. Further, the supplied electric current may be independent of the voltage across the current source 224. The switch 220 may selectively connect the electroactive device 100 to the power source 221 and may be open or closed. In the closed case, the switch 220 may permit the current source 224 to deliver current to the electroactive device 100.

The power source 221 may be connected to an analyzer/controller 226. The analyzer/controller 226 may be configured to control the power source 221, for example, by sending and receiving one or more electric signals to the analyzer/controller 226. The analyzer/controller 226 may thereby be able to measure the state (e.g., a shape or force output) of the electroactive device 100. This may be because the state of the electroactive device 100 may correlate with the measured voltages and/or currents that are determined by the analyzer/controller 226 in combination with the power source 221 and the electroactive device 100 circuit. The analyzer/controller 226 may determine a difference between a given state of the electroactive device 100 and a given set-point (e.g., a predetermined state for the electroactive device 100). The analyzer/controller 226 may be configured to modify the voltage output of the voltage source 222 and/or the current output of the current source 224 of the power source 221 applied to the electroactive device 100 after measurement of the voltages and/or currents. Accordingly, the analyzer/controller 226 may be able to control a future state of the electroactive device 100 based at least in part on its current state or past state. The analyzer/controller 226 may include a closed loop controller, which may have a feedback loop. The feedback loop may ensure that the analyzer/controller 226 exerts an action to control a process variable (e.g., voltage and/or current applied to the electroactive device 100) at a value corresponding to the setpoint.

In some embodiments, the analyzer/controller 226 may include a proportional-integral-derivative controller (PID controller). A PID controller may refer to a controller that may use a control loop feedback mechanism for providing continuously modulated control of the electroactive device 100. The PID controller may continuously calculate an error value over time, e(t), as the difference between a given setpoint (SP) and a measured process variable (PV, e.g., a voltage, a current, a capacitance, a resistance, any quantities derived from such process variables including a state and/or shape of the electronic device 100, combinations thereof, and/or the like). The PID controller may then apply a second signal (e.g., a correction signal) including a second voltage and/or current to the electroactive device 100, the second signal determined based at least in part on the proportional, integral, and derivative terms (denoted P, I, and D respectively). Further, the analyzer/controller 226 may serve to minimize the error over time by adjustment of one or more control variables (e.g., voltage, current, or both) to new values as determined, for example, by a weighted sum of the control terms.

Figure 2C:
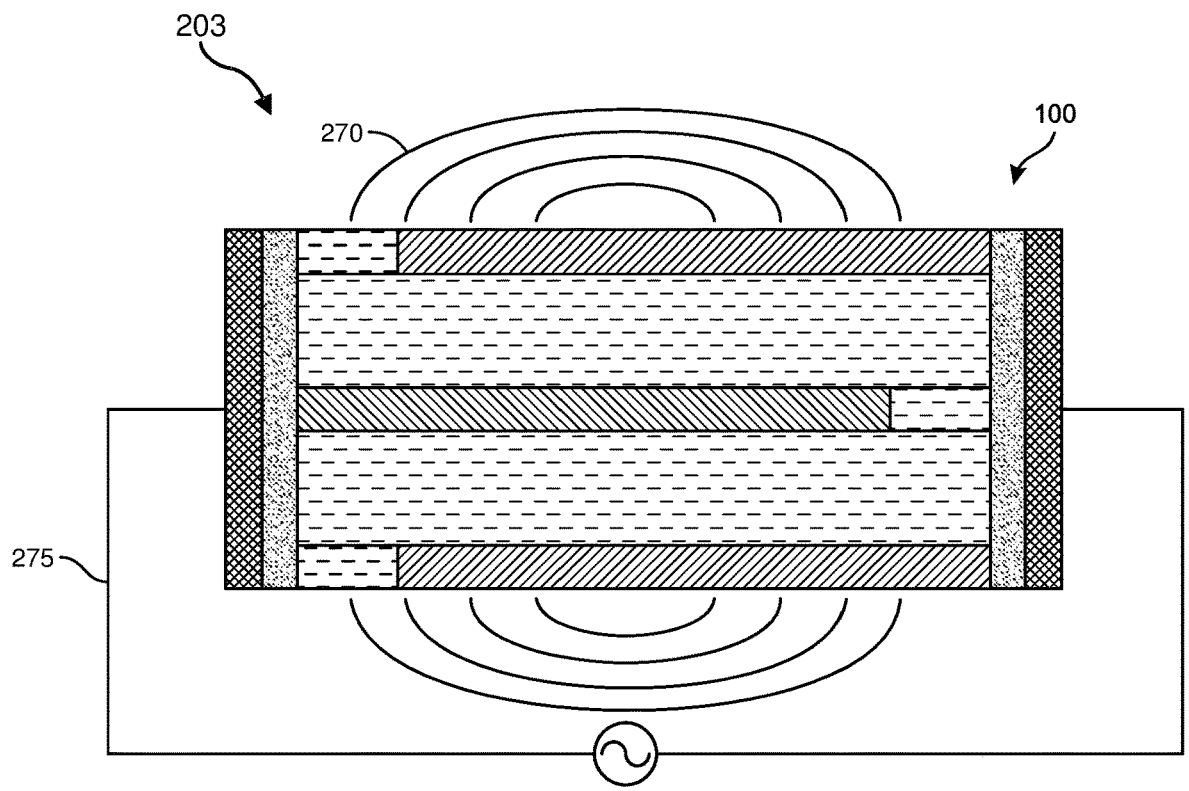
FIG. 2C illustrates the exemplary electroactive device of FIG. 2A generating a haptic output in accordance with embodiments of the present disclosure.

FIG. 2B shows a diagram 201 and FIG. 2C shows a diagram 203 that respectively illustrate different operational modes of the electroactive device 100. As shown in diagram 201, a voltage source 255 (e.g., a direct current (DC) power supply) may be used to bias the electroactive device 100 at a given set point. Upon the application of an external force 250 (e.g., a user's finger or other object pressing on a portion of the electroactive device 100), the electroactive device 100 may measure at least one parameter (e.g., a resistance, a capacitance, an inductance, and/or the like) proportional to the applied force. For example, an electroactive polymer (e.g., electroactive polymer elements 105 and/or 110 of FIG. 1A) may be configured to change, upon deformation (e.g., compression) by an application of an in-plane or an out-of-plane displacement, at least one parameter (e.g., a resistance, a capacitance, an inductance, and/or the like) between corresponding electrodes of the electroactive device 100. This change in the at least one parameter (e.g., a resistance, a capacitance, an inductance, and/or the like) may be detected using the analyzer/controller 226 shown and described in FIG. 2A, above. The disclosed systems may use various backend electronics and/or processors to determine the amount of displacement and/or type of displacement based on the change in the at least one parameter (e.g., a resistance, a capacitance, an inductance, and/or the like) and correlate the displacement to the applied force 250.

As shown in diagram 203 of FIG. 2C, the application of an alternating-current (AC) electric field 275 may cause the electroactive device 100 to undergo expansion and contraction (i.e., actuation). For example, electroactive polymer elements 105 and/or 110 of electroactive device 100 may alternately expand and contract between the abutting electrodes to alternately increase and decrease a height and/or thickness of electroactive device 100. Further, such alternating actuation can be rapidly cycled to generate a haptic output 270, which may include vibrations that may be felt by a user (e.g., by a finger and/or other abutting portion of the user's body). Further, the actuation may have a predetermined frequency, amplitude, and/or phase, which may vary over time in order to produce a particular sensation that may be felt by the user. Such actuation may serve to provide haptic output to a user's finger to enable tactile interaction with an electronic device (e.g., a touch screen of a mobile device).

In some embodiments, the disclosed electroactive devices may have different operational modes, such as those illustrated in FIGS. 2B and 2C, based on the states of the electroactive element(s). For example, a given electroactive device may be used as a touch sensor as shown in diagram 201 of FIG. 2B. Alternatively, the electroactive device may be used as an HFE as shown in diagram 203 of FIG. 2C. In various embodiments, the same electroactive device may be used as either a touch sensor or as an HFE, or both as a touch sensor and as an HFE. For example, the scanning and/or driving rates of an electronic driving circuit (not shown) coupled to electroactive devices may be configured so that a single electroactive device may alternate between one operational mode corresponding to touch sensor operation and another operational mode corresponding to HFE operation.

Figure 3:
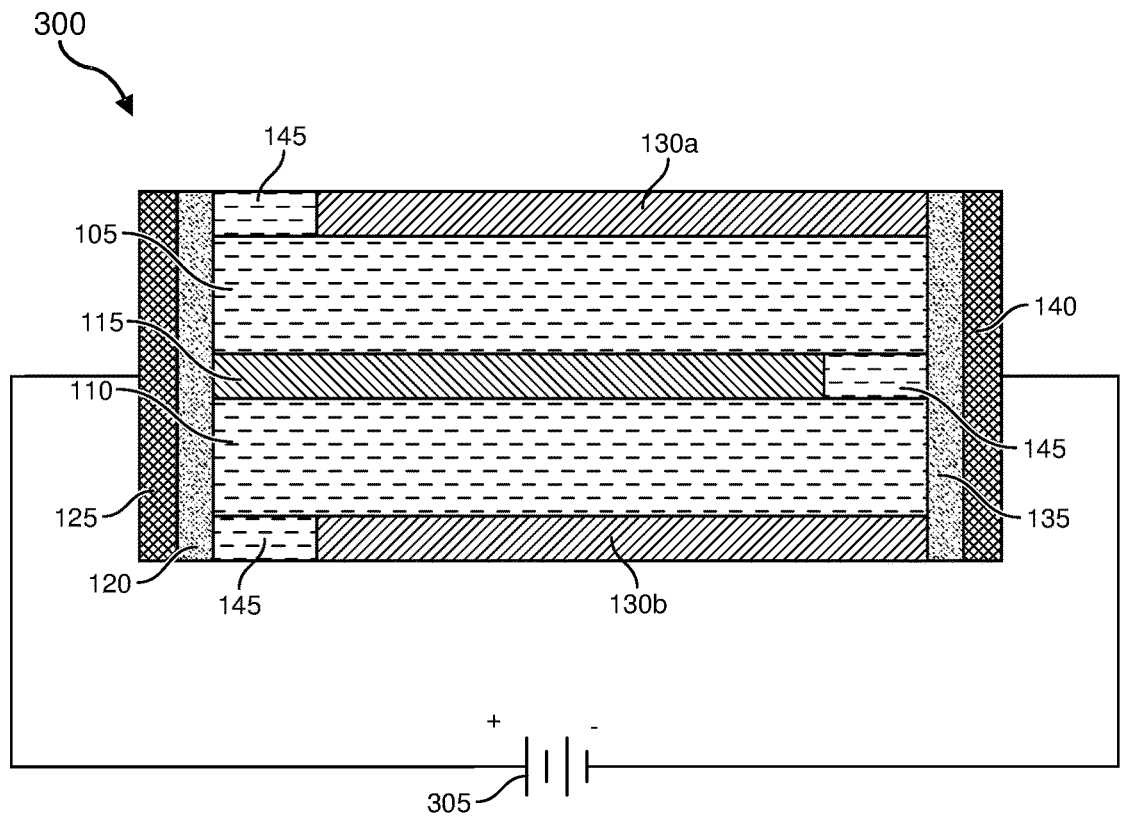
FIG. 3 illustrates an exemplary electroactive device having horizontal connections to driving electrodes in connection with embodiments of this disclosure.

Electroactive devices, as described herein, may be coupled to electrical connections at any suitable locations, such as from a side (i.e., a lateral side), a top (i.e., an upper layer), and/or a bottom (i.e., a lower layer) of the electroactive device, as will be shown and described below in relation to FIGS. 3 and 4. In particular, FIG. 3 illustrates an exemplary electroactive device 300 having horizontal (i.e., lateral) electrical connections between the device electrodes and an external circuit. FIG. 3 shows an electroactive device similar to that shown in FIG. 1A, with electrical connections from a voltage source 305 made horizontally to the first common electrode 125 and first schoopage layer 120 in addition to the second common electrode 140 and second schoopage layer 135.

Figure 4:
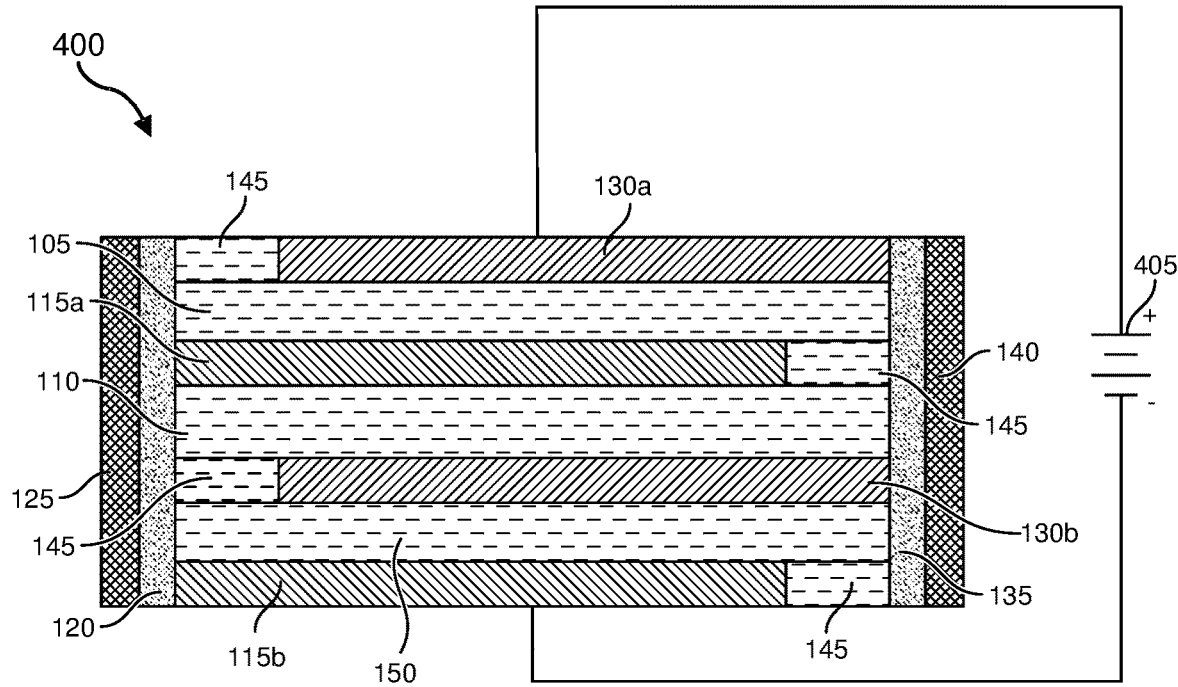
FIG. 4 illustrates the exemplary electroactive device having vertical connections to driving electrodes in connection with embodiments of this disclosure.

FIG. 4 illustrates an exemplary electroactive device 400 having vertical (i.e., top and bottom) electrical connections between the device electrodes and an external circuit. In particular, FIG. 4 shows a modified version of the electroactive device shown in FIG. 1A, which, in addition to the stacked layers shown in FIG. 1A, includes a third electroactive polymer element 150 disposed between electrode 130b of the second set of electrodes and an additional electrode 115b of the first set of electrodes. As shown in FIG. 4, electrical connections from a voltage source 405 may be made vertically to the top and bottom electrodes 130a and 115b, respectively.

The electrical connections and/or electrodes may include one or more layers. In some examples, the electrical connections may be made of flexible materials. Further, the electrical connections and/or electrodes may include one or more of metals, metal meshes, silver nanowires, carbon nanotubes, TCOs, conducting polymers, graphene, combinations thereof, and/or the like. As shown in FIGS. 3 and 4, the electrical connections to a given electroactive device may be formed from either the lateral sides, the top, the bottom, or a combination thereof of the electroactive device.

Figure 5A:
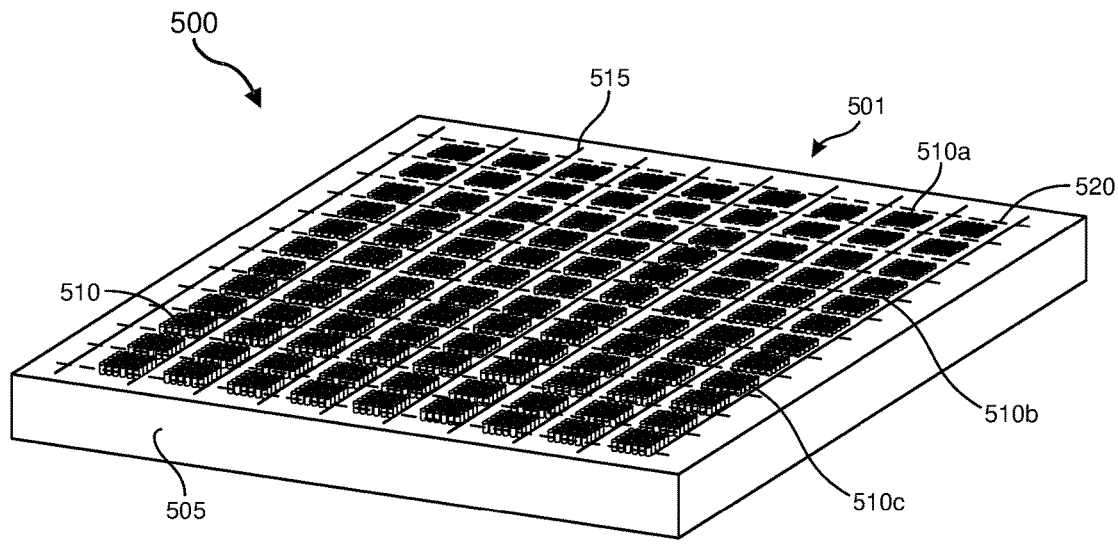
FIG. 5A illustrates an exemplary system including an array of electroactive devices disposed on a substrate in connection with embodiments of this disclosure.

FIG. 5A illustrates an exemplary system for providing touch sensing and/or haptic feedback, the system including an array of electroactive devices on a substrate. In particular, system 500 includes an array 501 of electroactive devices 510, which may include a plurality of separate electroactive devices 510 disposed on a substrate 505. Further, FIG. 5A shows examples of electrical lines, such as first electrical connection 515 and second electrical connection 520, configured to provide power from a source (not shown; see, e.g., FIGS. 2A-4) to each electroactive device 510 of the array 501. The electrical connections 515 and 520 may extend in rows and columns (e.g., perpendicular rows and column as shown in FIG. 5A) extending across at least a portion of the array 501 so as to be connected to the individual electrodes of each electroactive device 510.

In some embodiments, each of the electroactive devices 510 of the array 501 may be driven via the electrical connections 515 and 520 respectively abutting the electroactive device 510. Moreover, groups of electroactive devices 510 in the array 501 may be driven with common connections. In at least one example, the electroactive devices 510 may be grouped by function. For example, a group of electroactive devices 510 may be dedicated to detecting a given key input, such as a spacebar in a virtual keyboard application. Additionally, the electrical connections may include one or more layers.

In various embodiments, the array 501 of electroactive device 510 may be driven in an active or passive mode of operation. For example, a control circuit may be configured for each electroactive device 510 and may include one or more transistors, capacitors, inductors, and resistors. In some embodiments, the array 501 may be driven in an active mode of operation. The active mode of operation may include driving the electroactive devices 510 via time-domain multiplexing, frequency-domain multiplexing, code-division multiplexing, and/or any other suitable multiplexing technique.

In some embodiments, at least some of the electroactive devices 510 in the array may be in a passive state until a voltage change is detected and/or measured on a corresponding portion of the array 501. In particular, when the voltage change is detected and/or measured (for example, by control circuits), the corresponding electroactive devices 510 in the array 501 may register a voltage change and may become active. The control circuits may include one or more transistors, amplifiers, capacitors, inductors, resistor elements, and/or the like.

In various embodiments, at least a portion of the array 501 may be covered with a flexible layer, for example, to protect the array from the surrounding environment. The flexible layer may include any suitable material, such as a flexible material for conveying force to and/or from the electroactive devices 510, such as a glass and/or a polymer (e.g., polyimides, polyethylene, combinations thereof, and/or the like). In certain embodiments, the array 501 may be a stand-alone component. In some embodiments, at least a portion of the array 501 may be positioned above or below or otherwise coupled to a display. The display may include, for example, an LCD display, an LED display, a microLED display, an OLED display, or an LCOS display.

In some examples, a material may be deposited between the separate electroactive devices 510 (e.g., between two or more adjacent elements 510) in the array 501. The material may include an enclosed gas (e.g., air) or liquid, a polymer, an aerogel, an encapsulant, combinations thereof, and/or the like. Certain electroactive devices 510 in the array 501 may be compressed prior to use. This preliminary state may serve to modify the stiffness of the electroactive device 510 and change its electronic and/or mechanical performance.

There may be any suitable number of electroactive devices 510 in the array 501 (e.g., an x by y array, where x and y are positive integers). The array 501 may include electroactive devices 510 having any suitable shape (e.g., square shapes, rectangular (non-square) shapes, polygonal shapes, and/or irregular shapes). The electroactive devices 510 of the array 501 may have different sizes and/or different heights. Various electroactive devices 510 of the array 501 may be configured to operate as at least one of a touch sensor, an HFE, or both. In some embodiments, at least one electroactive device 510 of the array 501 may include a plurality of layered electroactive polymer elements (see, e.g., FIG. 1A), where the number of stacked electroactive polymer elements is between about 1 and about 10,000.

In some embodiments, different electroactive devices 510 may be compressed and/or expanded to different extents in response to an external force (e.g., from a user interaction) and/or in response to application of voltages to selected electroactive devices 510. For example, as illustrated in FIG. 5A, electroactive device 510a and surrounding electroactive devices 510 may be located near a center of a region touched by a user's fingertip and, accordingly, may experience a more significant amount of compression. Electroactive device 510b may be located further from the central touch region and may experience a lesser degree of compression, while electroactive device 510c, which is not in a region touched by the user, may not be compressed or may be minimally compressed. Different capacitance changes may be detected for each of electroactive devices 510a, 510b, and 510c, allowing for more accurate determination of a region or regions of the array 501 interacted with by the user and enabling greater sensitivity to touch interactions. Additionally or alternatively, various electroactive devices 510, such as electroactive devices 510a, 510b, and 510c, may be actuated to produce different degrees of contraction and/or expansion at various times based on selective application of voltages to first and second electrical connections 515 and 520, enabling a wide range of haptic feedback to be conveyed to user.

Figure 5B:
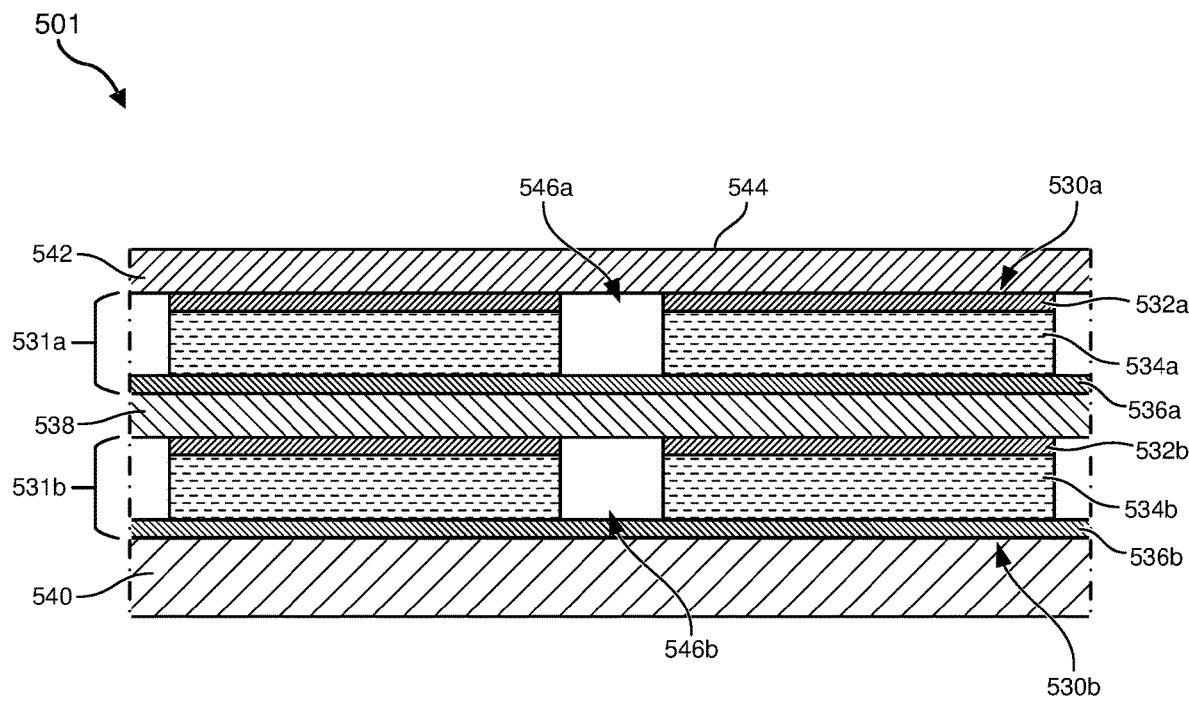
FIG. 5B illustrates a cross-sectional view of an exemplary system including multiple layers of stacked electroactive devices in connection with embodiments of this disclosure.

FIG. 5B illustrates a cross-sectional view of a portion of an exemplary interactive tactile system, such as the system shown in FIG. 5A, for providing touch sensing and/or haptic feedback. In some embodiments, electroactive devices, such as HFEs and/or touch sensors may be arrayed in a single layer, as described above. In additional embodiments, multiple electroactive devices may be stacked on top of each other. The stacked electroactive devices may, in some examples, be disposed in overlapping arrays in different layers of an interactive tactile system. As shown, for example, in FIG. 5B, the plurality of electroactive devices may be arrayed in two or more separate electroactive device layers of exemplary system 501. FIG. 5B shows a first, or upper, electroactive device layer 531a that includes a first array of electroactive devices 530a and a second, or lower, electroactive device layer 531b that includes a second array of electroactive devices 530b. Each electroactive device 530a may include a first electrode 532a (e.g., a portion of a first electrical connection coupled to a voltage source), a second electrode 536a (e.g., a portion of a second electrical connection coupled to a voltage source), and an electroactive element 534a (e.g., an elastomeric NVP material) disposed between the first and second electrodes 532a and 536a. In some examples, the first and second electrical connections including or electrically coupled to first and second electrodes 536a and 536b may be arranged perpendicular to each other (see, e.g., FIGS. 5A and 6A).

As shown in FIG. 5B, each electroactive device 530a may be stacked with one or more additional electroactive devices, such as an overlapping electroactive device 530b as shown, so as to at least partially overlap the additional electroactive devices. For example, each electroactive device 530a in the upper electroactive device layer 531a may overlap a corresponding electroactive device 530b in the lower electroactive device layer 531b. As shown, each electroactive device 530b may include a first electrode 532b, and a second electrode 536b, and an electroactive element 534b disposed therebetween. An insulation layer 538 may be disposed between the array of electroactive devices 530a and the array of electroactive devices 530b so as to electrically isolate electroactive devices 530a from electroactive devices 530b. Additionally, the stacked electroactive devices may be disposed on a substrate 540, which may, for example, be positioned adjacent electroactive devices 530b in the lower electroactive device layer 531b as shown. In at least one embodiment, a covering layer 542 may be disposed on a user-facing side of the stacked electroactive device arrays opposite substrate 540 (e.g., covering layer 542 may be disposed over first electrodes 532a). Cover layer 542 may include a touch surface 544 facing outward and designed to be physically interacted with by a user. For example, a user may apply a force (e.g., via a finger) to touch surface 544 to compress and/or to receive haptic feedback from at least a some of the underlying electroactive devices. Cover layer 542 may be formed of any suitable flexible and/or protective material, such as a glass material, a polymer material (e.g., polyimide, polyethylene, and the like), and/or any other suitable material. Accordingly, cover layer 542 may resiliently flex at various locations in response to forces applied by an external user and forces applied by various electroactive devices 530a and 530b.

In certain examples, electroactive devices may be separated from each other by divider regions. For example, divider regions 546a may separate adjacent electroactive devices 530a and divider regions 546b may separate adjacent electroactive devices 530b. The divider regions may electrically isolate the electroactive devices from each other and, additionally, may allow for lateral expansion of the electroactive devices during deformation (e.g., during compression of the electroactive devices induced by voltages applied to the electrodes and/or in response to an external force applied by a user). Divider regions 546a and 546b may be filled with a divider material, such as a compressible medium, examples of which include an enclosed gas (e.g., air) or liquid, a polymer, an aerogel, an encapsulant (e.g., surrounding another medium), combinations thereof, and/or the like. In some embodiments, insulation layer 538 may electrically isolate the first layer 531a including electroactive devices 530a from the second layer 531b including electroactive devices 530b. While FIG. 5B illustrates a system having two electroactive device layers, any suitable number of stacked electroactive device layers may be utilized in various interactive tactile systems disclosed herein.

Additionally, while each of the exemplary electroactive devices 530a and 530b are illustrated in this figure as including a single electroactive element disposed between an abutting pair of electrodes, any suitable electroactive devices described herein, including those having multiple stacked electroactive elements and electrodes as described in connection with FIGS. 1A-4, may be used.

The stacked electroactive devices may be utilized in any suitable manner to provide various touch sensing, and/or haptic feedback functionalities in system 501. According to at least one embodiment, a first electroactive device may provide haptic feedback to a user, while a second electroactive device in a separate stacked layer may provide touch sensing functionality. For example, one or more of electroactive devices 530a may function as haptic feedback devices, while one or more of electroactive devices 530b may function as touch sensing devices, or vice-versa. System 501 may, for example, detect a force exerted by a user's finger on touch surface 544 that results in compression of one or more electroactive devices, such electroactive devices 530b, in the region beneath the contacted portion of touch surface 544. Compression of the electroactive devices 530b may produce changes in one or more parameters (e.g., a resistance, a capacitance, an inductance, and/or the like) of the affected electroactive devices 530b, and these changes may be correlated to the user touch interaction. In response, haptic feedback may be provided to the user via one or more electroactive devices 530a overlapping the compressed electroactive devices 530b in the contracted region. For example, voltages may be selectively applied via first and second electrodes 532a and 536a to the abutting electroactive devices 530a, causing their electroactive elements 534a to deform (e.g., contract and/or expand) and generate movement and/or vibrations that may be sensed by the user's finger contacting touch surface 544. In various examples, the predetermined voltages may be applied to electroactive devices 530a in a selected sequence to deliver a desired type of haptic feedback to the user.

In some examples, one or more of electroactive devices 530a and/or 530b may be selectively deformed so as to produce a three-dimensional pattern on touch surface 544 prior to and/or during a user's tactile interaction with touch surface 544. Such a pattern, which may include various raised and/or recessed portions that are tactually perceptible on touch surface 544, can facilitate tactile user navigation and interaction with different portions of touch surface 544, even in the absence of visual cues. In at least one embodiment, stacked electroactive devices in different electroactive device layers may be simultaneously actuated to provide a greater range and/or degree of deformation. For example, an electroactive device 530a and an overlapping electroactive device 530b may both be deformed (e.g., compressed or expanded) simultaneously to induce an increased amount of displacement and/or vibration that is detectable by a user contacting touch surface 544. Additionally or alternatively, stacked electroactive devices in separate electroactive device layers may be used in combination as touch sensors for detecting an external force applied by a user to touch surface 544. For example, an electroactive device 530a and an overlapping electroactive device 530b may both detect user contact that at least partially compresses the electroactive devices and 530a and 530b. These systems may allow for increased touch sensing sensitivity and/or a greater range of tactile user interactions. Any other suitable combination of electroactive devices configured as touch sensor elements and/or HFEs may be utilized in the system as desired. In some examples, various electroactive devices may be alternately utilized as touch sensors and HFEs during different time periods, allowing for increased variability in configurating the disclosed systems.

Figure 6A:
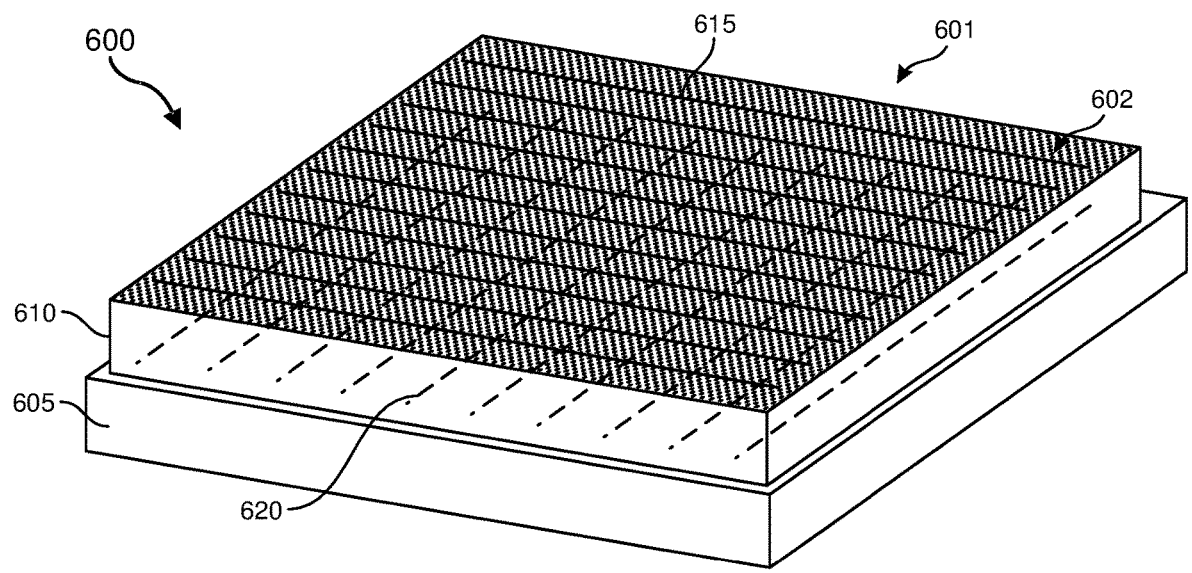
FIG. 6A illustrates an exemplary system including a planar array of electroactive devices disposed on a substrate in connection with example embodiments of this disclosure.

FIG. 6A illustrates an exemplary system for providing touch sensing and/or haptic feedback, the system including an array of electroactive devices formed from a planar electroactive sheet disposed on a substrate. In particular, system 600 includes an array 601 of electroactive devices 602 formed by a contiguous sheet of an electroactive polymer element 610 on a substrate 605. In some examples, the contiguous electroactive polymer element 610 may include a multi-layer NVP. The array 601 may further include a top set of electrode lines 615 coupled to one side of the electroactive polymer element 610 and a bottom set of electrode lines 620 coupled to an opposing side of the electroactive polymer element 610. Further, the bottom set of electrode lines 620 may be oriented perpendicular or approximately perpendicular with respect to the top set of electrode lines 615. The disclosed systems may drive electroactive devices 602 of array 601 using an addressing scheme that may include driving one or more of the top set of electrical lines 615 and one or more of the bottom set of electrical lines 620. Further, the disclosed systems may detect and quantify displacements between the top set of electrical lines 615 and the bottom set of electrical lines 620 associated with portions of the contiguous sheet of the electroactive element 610. Accordingly, the array 601 shown in diagram 600 does not include a plurality of separated electroactive devices having distinct electroactive polymer elements, as shown and described in connection with FIG. 5A above. Instead, a grid of electrode lines 615 and 620 sandwiches the electroactive polymer element 610, which is formed as a contiguous layer or sheet. The disclosed systems can control different localized portions of the electroactive polymer element 610 as electroactive devices 602 by selectively driving electrodes lines 615 and 620 that are physically proximate to the localized portions.

In various embodiments, a system having an array 501 of separate electroactive devices 510, as shown and described in connection with FIG. 5A, or a system having an array 601 of electroactive devices 602 formed from a contiguous sheet of an electroactive polymer element 610, as shown and described in connection with FIG. 6A, may be controlled use any suitable addressing method. In particular, for a system having individual electroactive devices, the electroactive devices may be addressed using direct, matrix, and/or raster addressing methods. Further, for a system having electroactive devices that include a common electroactive polymer element formed as contiguous sheet, the sets of top and bottom electrodes may be addressed using direct, matrix, and/or raster addressing methods. In another embodiment, direct addressing may include providing individual control signals to each electroactive device of the array. In one embodiment, matrix addressing may include providing control signals to the electrodes in the rows and columns of the array. For an array having a size of m×n elements or electrode array intersections, matrix addressing may require m+n control signals. In some examples, active matrix addressing may include using a capacitor associated with each electroactive device and/or portion of the array used to maintain the state of the electroactive device and/or portion of the array. In another aspect, raster addressing may refer to scanning across the entire array in sequence while modulating control signals to activate each electroactive device and/or portion of the array as it is scanned. In a raster addressing method, there may be three control signals: a horizontal scan control signal, a vertical scan control signal, and an intensity control signal. Further, the timing between these signals may be predetermined and engineered to reduce artifacts, cross-talk between electroactive devices and/or portion of the array, and/or the like. In various embodiments, each electroactive device and/or portion of the array may be switched actively. In particular, each electroactive device may be coupled to a transistor and a capacitor actively maintaining the electroactive device's state while other electroactive devices are being addressed. Active switching may be contrasted with techniques in which each element maintains its state passively, without being driven by circuitry.

Figure 6B:
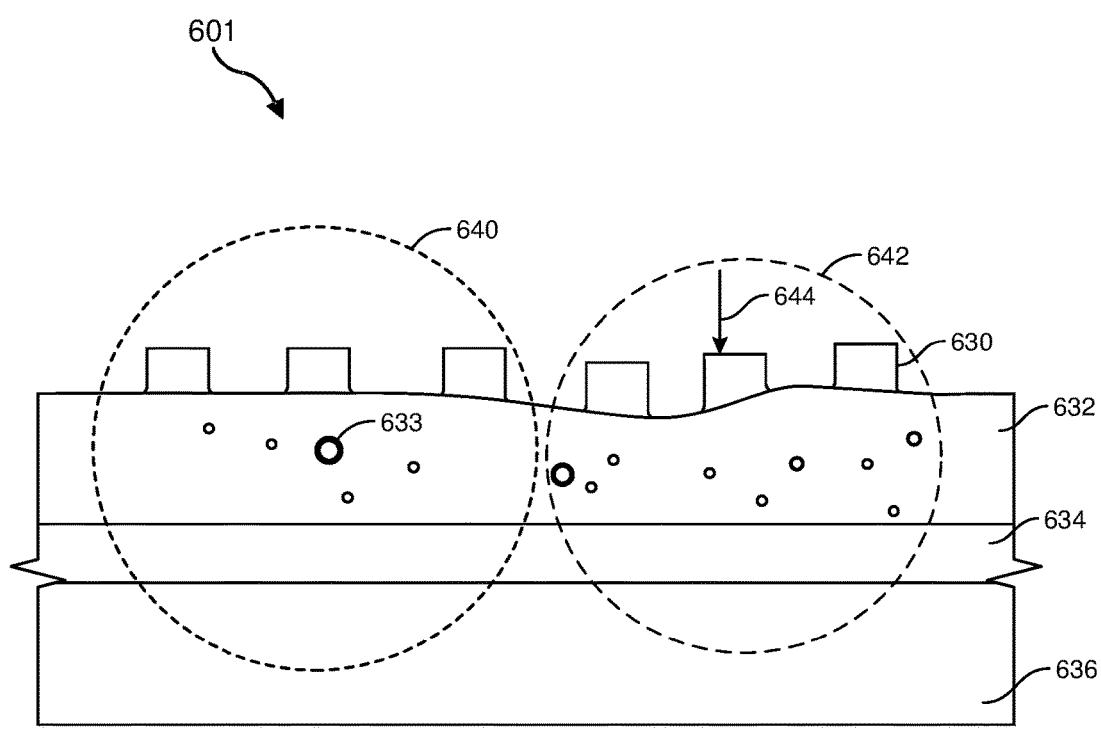
FIG. 6B illustrates a cross-sectional view of the exemplary system of FIG. 6A in connection with embodiments of this disclosure.

FIG. 6B illustrates an exemplary cross-sectional view of a portion of the system shown in FIG. 6A. In particular, diagram 601 includes a cross-sectional view of a top set of electrodes 630, an NVP element 632 including nanovoids 633 defined in an electroactive polymer bulk matrix, a bottom set of electrodes 634, and a substrate 636, as variously described herein. Further, the portion of the array shows an uncompressed portion 640 and a compressed portion 642, which may be present at substantially the same time. The compressed portion 642 of the electroactive device may be formed as a result of an application of an in-plane or an out-of-plane displacement 644. The compressed portion 642 may result in a change in capacitance between the top set of electrodes 630 and the bottom set of electrodes 634. In some embodiments, portions of NVP element 632 may be compressed or expanded by selectively applying voltages to one or more of the top set of electrodes 630 and one or more of the bottom set of electrodes 634 to produce a desired potential difference between the electrodes abutting the portions of portions of NVP element 632.

Figure 7:
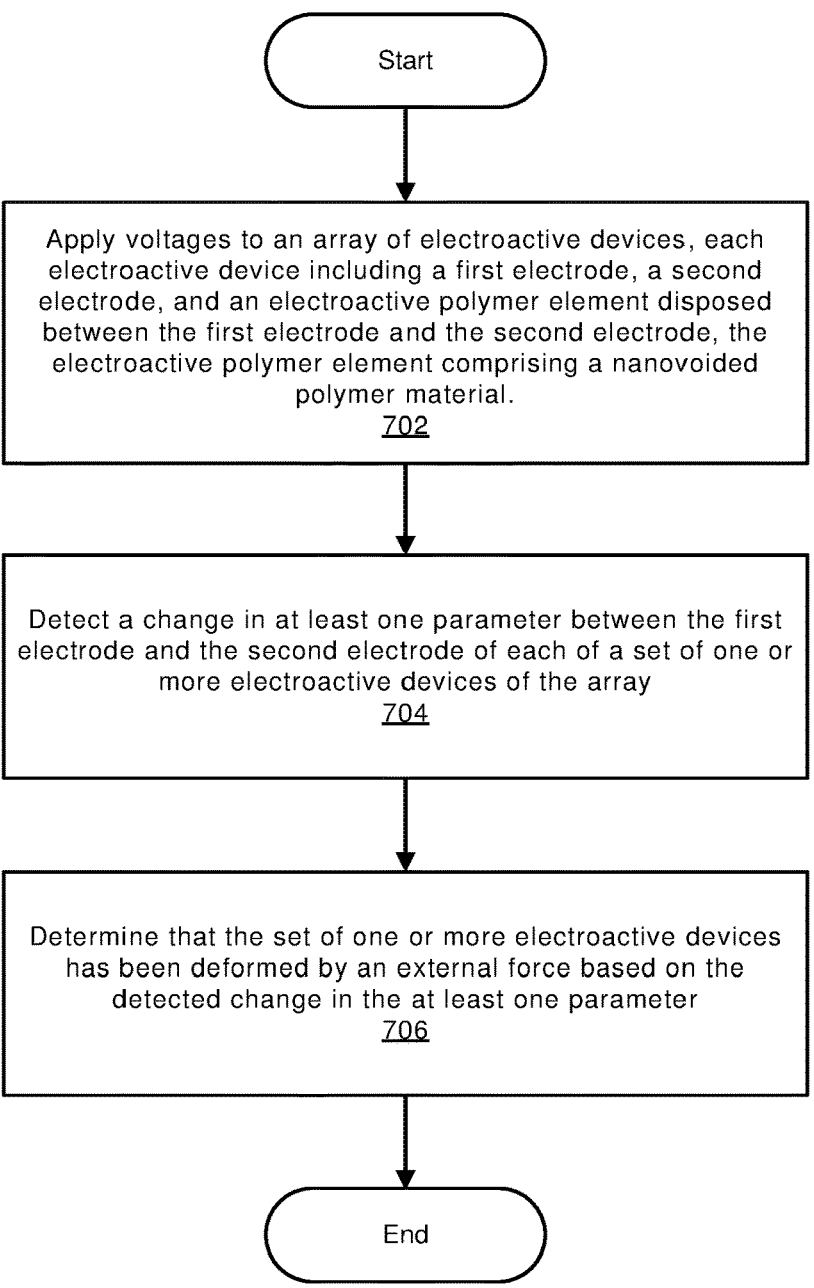
FIG. 7 illustrates a diagram of an exemplary method for using the disclosed electroactive devices in connection with embodiments of this disclosure.

FIG. 7 illustrates a diagram of an exemplary method 700 for using the disclosed electroactive devices. At block 702, the method may include applying voltages to an array of electroactive devices, such as array 501 of electroactive devices 510 shown in FIG. 5A (see also FIGS. 6A and 6B). Each electroactive device of the array may include 1) a first electrode (e.g., 115 in FIG. 1A), 2) a second electrode (e.g., second electrodes 130a and/or 130b in FIG. 1A), and 3) an electroactive polymer element (e.g., electroactive polymer elements 105 and 110 in FIG. 1A) disposed between the first electrode and the second electrode, the electroactive polymer element comprising an NVP material (see also FIGS. 1B-6B). The voltages may be applied, for example, by control circuitry (e.g., analyzer/controller 226 in FIG. 2A). The application of the voltage may include applying the voltage in an active mode of operation. The active mode of operation may include at least one of a time-domain multiplexing technique, a frequency-domain multiplexing technique, or a code-division multiplexing technique.

At block 704, the method may include detecting (e.g., via the control circuitry) a change in at least one parameter (e.g., a resistance, a capacitance, an inductance, and/or the like) between the first electrode and the second electrode of each of a set of one or more electroactive devices of the array.

At block 706, the method may include determining (e.g., by the control circuitry) that the set of one or more electroactive devices has been deformed by an external force based on the detected change in the at least one parameter (e.g., a resistance, a capacitance, an inductance, and/or the like). For example, the detected change in the at least one parameter (e.g., a resistance, a capacitance, an inductance, and/or the like) may be correlated to an amount of deformation applied by the external force (e.g., a user's finger) to the one or more electroactive devices (see, e.g., FIGS. 2B, 5, and 6B).

In some embodiments, the method may further include increasing a potential difference between the first electrode and the second electrode of each of an additional set of one or more electroactive devices of the array so as to mechanically deform the electroactive polymer element in each of the additional set of one or more electroactive devices (see, e.g., FIGS. 2C, 5, and 6B).

Figure 8A:
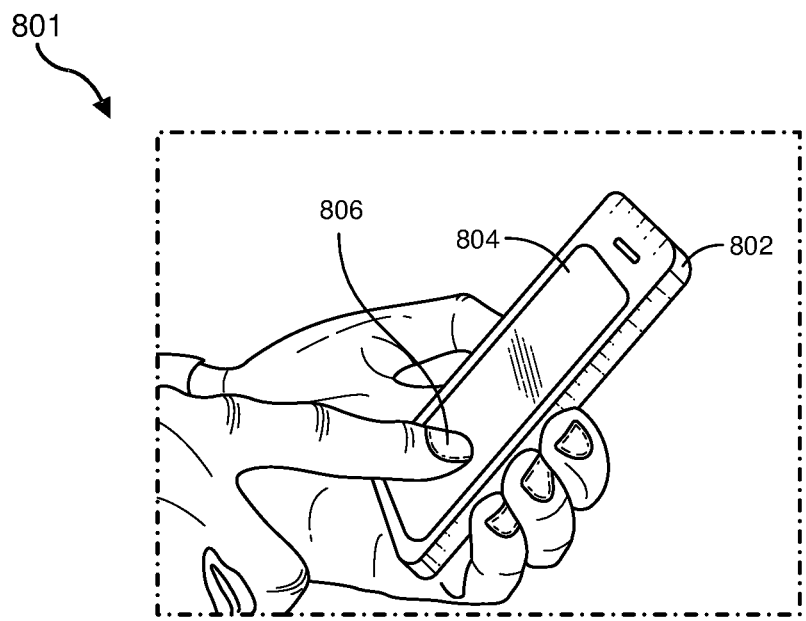
FIG. 8A illustrates an example use case of the electroactive devices as a touch sensor and/or a haptic feedback element in a mobile device in connection with embodiments of this disclosure.

FIG. 8A illustrates diagrams representing an example use case of the disclosed systems and devices as touch sensors and/or HFEs in a mobile device. In particular, diagram 801 represents a use case involving a mobile device 802 having a touch screen 804. In some examples, the touch screen 804 may include an array of electroactive devices including individual electroactive elements as shown and described in connection with FIG. 5A, above. In another example, the touch screen 804 may include a contiguous sheet of an electroactive polymer element that is sandwiched by electrode lines in grid form as shown and described in connection with FIG. 6A, above.

In one example, a user's finger 806 may interact with the mobile device 802 by pressing on the touch screen 804 in a touch sensor mode of operation. For example, the user may select various graphical elements depicted on the touch screen 804. In another example, the user's finger 806 may receive haptic feedback (e.g., vibrations) generated by the touch screen 804 of the mobile device 802, the touch screen 804 operating in a haptic feedback mode of operation. For example, the user's finger 806 may receive haptic feedback when the user's finger 806 selects an icon depicted on the touch screen 804 for launching an application on the mobile device 802.

As noted, the touch screen 804 may include an array having electroactive devices with respective thicknesses configured to texture a surface of the array of electroactive devices. In this way, the user's finger 806 may be feel different portions of the touch screen 804 differently. For example, the disclosed systems may enable the touch screen 804 to allow the user's finger 806 to feel different icons differently. This may allow the user to select one icon over another without directly looking at the icons, but rather, by feeling a tactile difference between different portions of the touch screen 804 corresponding to the icons.

Figure 8B:
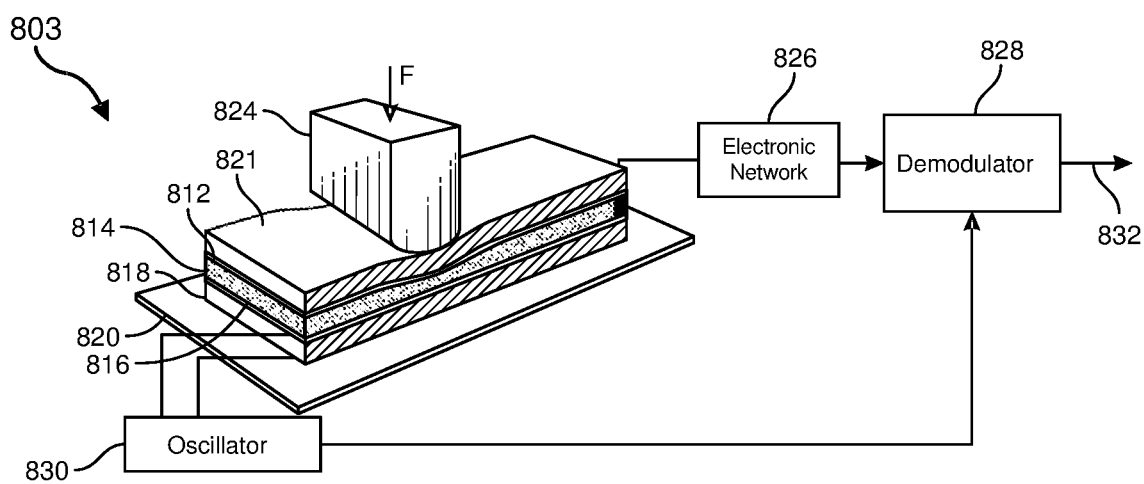
FIG. 8B shows a diagram illustrating a different view of a portion of a device having an electroactive device along with associated backend electronics in connection with embodiments of this disclosure.

FIG. 8B shows a diagram illustrating a different view of a portion of a device having an electroactive device along with associated backend electronics. In particular, diagram 803 shows an electroactive device along with various backend electronics for controlling the electroactive device. In particular, the electroactive device may include components such as a top electrode 812, an electroactive element 814, and a bottom electrode 816, as variously described herein. The components may be disposed on a substrate 818, and the electroactive device may be covered with a flexible material 821. As noted, the flexible material 821 may include at least one of a glass material or a polymer material (e.g., a polyimide material, and/or a polyethylene material).

A user may interact with the electroactive device by pressing, with the user's finger 824 on a portion of the electroactive device to yield an in-plane or an out-of-plane displacement. Accordingly, a compressed portion of the electroactive device may develop as a result of an application of the pressure. This may result in a change in an electric parameter (e.g., a resistance, a capacitance, an inductance, and/or the like) between the top electrode 812 and the bottom electrode 816. The electroactive device and the components described above may be coupled to a display 820 (e.g., an LCD display, an LED display, a microLED display, an OLED display, an LCOS display, and/or the like). Further, the electroactive device, along with various backend electronics, may include an electronic network 826, a demodulator 828 and/or oscillator 830.

In some examples, the electronic network 826 may include an electronic filter that may serve to condition the detected signals prior to processing. In particular, the electronic filters may be passive or active, analog or digital, high-pass, low-pass, band-pass, and/or band-stop (including band-rejection and/or notch filters). In another embodiment, the backend electronics may include discrete-time (sampled) or continuous-time filters. Further, the backend electronics may include filters that may be linear or non-linear.

In an example, the demodulator 828 may refer to an electronic circuit that may be used to recover data corresponding to the in-plane and/or out-of-plane displacements from a modulated carrier wave generated, for example, by the oscillator 830. In particular, the oscillator 830 may output a signal of a given frequency and amplitude to the electroactive element 814. The electroactive element 814 may undergo a change in at least one parameter (e.g., a resistance, a capacitance, an inductance, and/or the like) as a result of an applied compressive force by the user's finger 824. The electronic network 826 may filter the signals further using various passive and/or active components to produce the signal in a form that is processable by the demodulator 828. The demodulator 828 may then remove the effect of the modulated carrier wave, leaving an output signal 832 corresponding to the change in capacitance of the electroactive element 814. The disclosed systems may then process the output signal 832 in a digital domain (e.g., via a processor and/or microcontroller, not shown) to take at least one action (e.g., display an image on the display 820, etc.).

As noted, the oscillator 830 may produce a periodic, oscillating electronic signal. The signal may serve as a carrier wave and may include a sine wave or a square wave. In some examples, the oscillator 830 may operate at a predetermined frequency and amplitude. Further, the oscillator's output may be used to bias the electroactive device at a given setpoint to enable the detection of in-plane and out-of-plane compression of the electroactive element 814. In another example, the oscillator 830 may output a signal that is configured to cause the electroactive element 814 to vibrate at a different predetermined frequency and amplitude. This may allow for the electroactive device to provide haptic feedback to the user's finger 824.

The methods, systems, and devices shown and described herein may enable combinations of positional touch sensing, force and/or intensity touch sensing, and/or haptic feedback in display devices and other interactive touch devices, with such sensing and haptic modes being integrated into a single functional layer or region of the device. The integration of these multiple functionalities into a common region may enable reductions in overall form factors of interactive devices, such as display devices, while allowing for increases in fabrication yield, mechanical flexibility, spatial resolution, signal-to-noise ratio, and power performance of these devices. In some examples, interactive touch surfaces may be textured to facilitate user interaction without the requiring the user to look at the touch surfaces prior to and/or during use.

Electroactive Devices

In some applications, an electroactive device used in connection with the principles disclosed herein may include a first electrode, a second electrode, and an electroactive element disposed between the first electrode and the second electrode. The electroactive element may include an electroactive material such as an electroactive polymer (e.g., an NVP) and a plurality of voids (also referred to herein as nanovoids) distributed within the electroactive polymer, for example as a porous polymer structure. Voids may be generally isolated from each other, or, at least in part, be interconnected through an open-cell structure. The plurality of voids may have a non-uniform distribution within the electroactive polymer, and the electroactive element may have a non-uniform electroactive response when an electrical signal is applied between the first electrode and the second electrode, based on the non-uniform distribution of voids.

A non-uniform distribution of the plurality of voids may include a spatial variation in at least one of void diameter, void volume, void number density, void volume fraction, or void orientation (e.g., in the case of anisotropic voids). Voids may include a non-polymeric material. Voids may include at least one of a gas, a liquid, a gel, a foam, or a non-polymeric solid. A non-uniform electroactive response may include a first deformation of a first portion of the electroactive element that differs from a second deformation of a second portion of the electroactive element. A deformation may include a compression (for example, parallel to an applied electric field), change in curvature, or other change in a dimensional parameter, such as length, width, height, and the like, in one or more directions. An electroactive device may have a first deformation on application of a first voltage between the first and second electrodes, and a second deformation on application of a second voltage between the first and second electrodes, with the first and second deformations being appreciably different. An electrical signal may include a potential difference, which may include a direct or alternating voltage. The frequency of alternating voltage may be selected to provide an appreciable haptic sensation on the skin of a wearer. In some embodiments, the frequency may be higher than the highest mechanical response frequency of the device, so that deformation may occur in response to the applied root-mean-square (RMS) electric field but with no appreciable oscillatory mechanical response to the applied frequency. The applied electrical signal may generate non-uniform constriction of the electroactive element between the first and second electrodes. A non-uniform electroactive response may include a curvature of a surface of the electroactive element, which may in some embodiments be a compound curvature.

In some embodiments, an electroactive device may include an optical element mechanically coupled to the electroactive element. An optical element may include at least one of a lens, a grating, a prism, a mirror, or a diffraction grating. In some embodiments, the electroactive device may be a component of a wearable device. The wearable device may include a helmet or other headwear, an eyewear frame, a glove, a belt, or any device configured to be positioned adjacent to or proximate the body of a wearer, for example to support the electroactive device proximate a user when the user wears the wearable device, and the electroactive device may be configured to provide a tactile signal to the user. In some embodiments, an electroactive device includes a first electrode, a second electrode, and an electroactive element located between the first electrode and the second electrode. The electroactive element may include an electroactive polymer and a plurality of voids having a non-uniform distribution within the electroactive element. Application of a mechanical input to a portion of the electroactive element generates an electric signal between the first electrode and the second electrode. The electrical response to a mechanical variation may vary over the electroactive device, with the magnitude being determined, at least in part, by the location of the mechanical input relative to the non-uniform distribution of voids within the electroactive element. The electroactive element may include a first portion and a second portion, and a first voltage generated by a mechanical input to the first portion is appreciably different from a second voltage generated by a similar mechanical input to the second portion.

The electroactive device may be a component of a wearable device, configured to be worn by a user. The wearable device may be configured to support the electroactive device against a body portion of the user. The electroactive device may be configured to provide an electrical signal correlated with a configuration of the body part, such as a configuration of a body part, such as a joint angle. For example, the electrical signal may be used to determine a joint angle of a finger portion, wrist, elbow, knee, ankle, toe, or other body joint, or the bend angle of a mechanical device. For example, the wearable device may be a glove, and the electroactive device may be configured to provide an electrical signal based, at least in part, on a joint angle within a hand of the user, such as the angle between portions of a finger. In some embodiments, a method includes generating an electroactive response in an electroactive device, the electroactive device including an electroactive element located between a first electrode and a second electrode, where the electroactive response to an electrical input or a mechanical input varies appreciably over a spatial extent of the electroactive device due to a non-uniform distribution of voids within the electroactive element.

In some embodiments, the electroactive response may include a mechanical response to the electrical input that varies over the spatial extent of the electroactive device, with the electrical input being applied between the first electrode and the second electrode. The mechanical response may be termed an actuation, and example devices may be or include actuators. In some embodiments, the electroactive response may include an electrical signal having a characteristic indicative of a location of the mechanical input to the electroactive device, the electrical signal being measured between the first electrode and the second electrode. The electrical signal may be a termed sensor signal, and in some embodiments, the electroactive device may be or include a sensor. In some embodiments, an electroactive device may be used as both an actuator and a sensor. In some embodiments, the electroactive device is supported against a hand of a user, and the electrical signal is used to determine a gesture by the user, the gesture including a finger movement. In some embodiments, typing inputs by a user, e.g., into a virtual keyboard, may be determined from sensor signals.

In some embodiments, an electroactive device may include one or more electroactive elements, and an electroactive element may include one or more electroactive materials, which may include one or more electroactive polymer materials. In various embodiments, an electroactive device may include a first electrode, a second electrode overlapping at least a portion of the first electrode, and an electroactive element disposed between the first electrode and the second electrode. In some embodiments, the electroactive element may include an electroactive polymer. In some embodiments, an electroactive element may include an elastomer material, which may be a polymer elastomeric material. In some embodiments, the elastomer material may have a Poisson's ratio of approximately 0.35 or less. The electroactive element may be deformable from an initial state to a deformed state when a first voltage is applied between the first electrode and the second electrode. The electroactive element may further be deformable to a second deformed state when a second voltage is applied between the first electrode and the second electrode.

In some embodiments, there may be one or more additional electrodes, and a common electrode may be electrically coupled to one or more of the additional electrodes. For example, electrodes and electroactive elements may be disposed in a stacked configuration, with a first common electrode coupled to a first plurality of electrodes, and a second common electrode electrically connected to a second plurality of electrodes. The first and second pluralities may alternate in a stacked configuration, so that each electroactive element is located between one of the first plurality of electrodes and one of the second plurality of electrodes.

In some embodiments, an electroactive element may have a maximum thickness in an undeformed state and a compressed thickness in a deformed state. In some embodiments, an electroactive element may have a density in an undeformed state that is approximately 90% or less of a density of the electroactive element in the deformed state. In some embodiments, an electroactive element may exhibit a strain of at least approximately 10% when a voltage is applied between the first electrode and the second electrode.

In some embodiments, an electroactive element may include at least one non-polymeric component in a plurality of defined regions and the method may further include removing at least a portion of the at least one non-polymeric component from the cured elastomer material to form an NVP material.

In some embodiments, an electroactive device may include an electroactive polymer configured with a first location of patterned nanovoids such that the first location has a different transduction behavior from a second location having a second location of patterned nanovoids. In some embodiments, a global electric field applied over the entirety of an electroactive element generates differential deformation between the first and second locations. An electroactive element may have a plurality of locations of patterned nanovoids such that when a first voltage is applied the EAP exhibits a predetermined compound curvature. The electroactive device may exhibit a second predetermined compound curvature, different from the first predetermined compound curvature, when a second voltage is applied. A wearable device may include an electroactive device, where the first compound curvature provides a first tactile feeling and the second compound curvature provides a second tactile feeling to a person when the person is wearing the wearable device. In some electrodes, the first electrode and/or the second electrode may be patterned, allowing a localized electric field to be applied to a portion of the device, for example to provide a localized compound curvature.

In some embodiments, a sensor may include an electroactive device, where the electroactive device comprises a first and a second portion, where the first portion has a different sensor response than the second portion due to a non-uniform distribution of patterned nanovoids. The sensor may be a wearable device. The sensor may be in electrical communication with a controller configured to determine a flexure of a wearable device based on the one or more electrical outputs from the wearable device. For example, the wearable device may comprise one or more electroactive devices configured as sensors. In some embodiments, a sensor may be configured to determine a joint position of a wearer of the sensor based on the one or more electrical signals from the sensor. The sensors may be part of a glove or other wearable device. In some embodiments, the sensor may include an arrangement of electroactive sensors and may be configured to determine keystrokes into a keyboard, where the keyboard may be a real or virtual keyboard.

A non-uniform distribution of voids within an electroactive element may include a functional dependence on a distance parameter, such as distance from an edge and/or center of an electroactive element. For example, an electroactive element may have a generally rectangular shape with a generally uniform thickness. In some embodiments, the volume fraction of voids may increase monotonically along a direction parallel to a longer side and/or a shorter side of the rectangular shape. In some examples, the void volume fraction may have a highest value in some portion of the electroactive element and decrease from the highest portion to portions with lower void volume fractions elsewhere, for example proximate an edge. In some examples, the void volume fraction may have a lowest value in some portion of the electroactive element and increase from the lowest portion to portions with higher void volume fractions elsewhere, for example proximate an edge of the electroactive element. In some examples, an electroactive element may have a generally disk shape. The volume fraction of voids may vary as a function of a radial distance from the disk center. In some embodiments, the volume fraction may be highest in a central portion of a disk-shaped electroactive element and decrease along a radial direction to an edge. In some embodiments, the volume fraction may be lowest in a central portion and increase along a radial direction to an edge. The variation in void volume fraction may have a functional relationship with a distance parameter, for example including one or more of a linear, quadratic, sinusoidal, undulating, parabolic, or other functional relationship with a distance parameter along one or more of the relevant distance parameters. For example, a distance parameter may be determined as the distance along an edge, obliquely across, from a center, or other distance measurement for a given electroactive element.

An electroactive element can convert deformations into electrical signals, such as proportional electrical signals that scale with a deformation parameter (such as applied pressure). An electroactive element may also receive an electrical signal that induces a deformation based on the electrical signal (for example, based on the voltage squared or mean square voltage). An electroactive device may be a transducer, with a degree of deformation based on the electrical signal, and/or as a sensor providing an electrical signal based on a degree of deformation. The electroactive response may be mediated by the dielectric constant and elastic modulus of the electroactive element. Using a single homogeneous polymer film constrains the transducer response to a particular input electrical signal/output mechanical response across the device. In some embodiments, an electroactive device actuates and/or senses deformations as a function of position within a single device, without the need for complex electrode structures, facilitating electroactive devices (such as transducers, actuators, and/or sensors) capable of spatially variable actuation and sensing responses, using a simple electrical architecture such as a pair of electrodes.

In some embodiments, a device may include a transducer that converts variations in a physical quantity into an electrical signal, and/or vice versa. In some embodiments, the electrical response of a transducer may be correlated with a location of a mechanical input. The process by which variations in a physical quantity transforms into an electrical signal, and/or vice versa, may be referred to as transduction. A transducer may include an electroactive element, such an electroactive polymer element. In some examples, an electroactive element may comprise an electroactive polymer with a distribution of voids formed therein.

In some embodiments, an electroactive element may include a distribution of voids. In some embodiments, a void may include a region filled with a different medium, such as a non-polymeric material, such as a gas such as air, or a liquid. A portion of the electroactive element may have a volume fraction of voids, which may be determined as the void volume within a portion of the electroactive element divided by the total volume of the portion of the electroactive element. In some embodiments, the void volume fraction may be a function of a distance parameter. For example, the void volume fraction may be a linear function of a distance from one edge of an electroactive element, for example increasing in a generally linear fashion from one side to another. In some examples, the volume void fraction may be a non-linear function of a distance parameter, such as a polynomial function (such as a quadratic function), a step function, a parabolic function, an undulating function, a sine function, or the like. A distance parameter may be a distance from an edge of an electroactive element. In some embodiments, an electroactive element may have a generally cuboid shape, for example having a length, width, and thickness, for example as determined along generally mutually orthogonal directions. The thickness of the electroactive element may be approximately equal to the electrode separation. In some embodiments, an electroactive element may have a disk shape, a wedge shape, an elongated form such as a rod, or other shape. A distance parameter may be (as appropriate) a distance along an edge (e.g. a distance from one side towards another side), a radial distance (e.g. a distance from a center or an edge of a disk-shaped form in a generally radial direction), or other distance measurement. In some embodiments, a volume void fraction may be a function of a distance parameter over a plurality of electroactive elements, for example including a plurality of electroactive elements having different mean void volume fractions (optionally having an appreciable internal variation of void volume fraction, or in some embodiments no appreciable internal variation of void volume fraction) arranged to obtain a desired variation of void volume fraction with distance across a plurality of electroactive elements.

In some embodiments, a system may include at least one physical processor, a physical memory including computer-executable instructions that, when executed by the physical processor, cause the physical processor to apply an electrical field across an electroactive device to obtain non-uniform actuation based on a non-uniform distribution of voids within an electroactive element of the electroactive device. In some embodiments, a system may include at least one physical processor, a physical memory including computer-executable instructions that, when executed by the physical processor, cause the physical processor to receive an electrical signal from an electroactive device, and to process the electrical signal to obtain a deformation parameter of the electroactive device, where the deformation parameter includes one or more of the following: a magnitude of a deformation, a location of a deformation, a bend angle, a gesture type (e.g., selected from a plurality of gesture types). The analysis of the electrical signal may be based at least in part on a non-uniform distribution of voids within an electroactive element of the electroactive device.

Electroactive Elements

In some embodiments, the electroactive elements described herein may include an elastomer having an effective Poisson's ratio of less than approximately 0.35 and an effective uncompressed density that is less than approximately 90% of the elastomer when densified. In some embodiments, the term "effective Poisson's ratio" may refer to the negative of the ratio of transverse strain (e.g., strain in a first direction) to axial strain (e.g., strain in a second direction) in a material. In some embodiments, the electroactive elements may include a NVP material.

In the presence of an electrostatic field, an electroactive polymer may deform (e.g., compress, elongates, bend, etc.) according to the strength of that field. Generation of such a field may be accomplished, for example, by placing the electroactive polymer between two electrodes, each of which is at a different potential. As the potential difference (i.e., voltage difference) between the electrodes is increased (e.g., from zero potential) the amount of deformation may also increase, principally along electric field lines. This deformation may achieve saturation when a certain electrostatic field strength has been reached. With no electrostatic field, the electroactive polymer may be in its relaxed state undergoing no induced deformation, or stated equivalently, no induced strain, either internal or external.

In some embodiments, a polymer element may include an elastomer. As used herein, an "elastomer" may (in some examples) refer to a material, such as a polymer, with viscoelasticity (i.e., both viscosity and elasticity), relatively weak intermolecular forces, and generally low elastic modulus (a measure of the stiffness of a solid material) and high failure strain compared with other materials. In some embodiments, an electroactive polymer may include an elastomer material that has an effective Poisson's ratio of less than approximately 0.35 (e.g., less than approximately 0.3, less than approximately 0.25, less than approximately 0.2, less than approximately 0.15, less than approximately 0.1, less than approximately 0.05). In at least one example, the elastomer material may have an effective density that is less than approximately 90% (e.g., less than approximately 80%, less than approximately 70%, less than approximately 60%, less than approximately 50%, less than approximately 40%) of the elastomer when densified (e.g., when the elastomer is compressed, for example, by electrodes to make the elastomer more dense).

In some embodiments, an electroactive element may include an elastomer material, which may have a Poisson's ratio of approximately 0.35 or less. In some embodiments, an electroactive element may have a thickness of approximately 10 nm to approximately 10 μm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 200 nm, approximately 300 nm, approximately 400 nm, approximately 500 nm, approximately 600 nm, approximately 700 nm, approximately 800 nm, approximately 900 nm, approximately 1 μm, approximately 2 μm, approximately 3 μm, approximately 4 μm, approximately 5 μm, approximately 6 μm, approximately 7 μm, approximately 8 μm, approximately 9 μm, approximately 10 μm), with an example thickness of approximately 200 nm to approximately 500 nm.

An electroactive device may include a plurality of stacked layers; for example, each layer may include an electroactive element disposed between a pair of electrodes. In some embodiments, an electrode may be shared between layers; for example, a device may have alternating electrodes and electroactive elements located between neighboring pairs of electrodes. Various stacked configurations can be constructed in different geometries that alter the shape, alignment, and spacing between layers. Such complex arrangements can enable compression, extension, twisting, and/or bending when operating the electroactive device.

Electroactive Polymers

An electroactive element may include one or more electroactive polymers and may also include additional components. As used herein, "electroactive polymers" may (in some examples) refer to polymers that exhibit a change in size or shape when stimulated by an electric field. Some electroactive polymers may find limited applications due to a low breakdown voltage of the polymers with respect to the operating voltage used by electroactive devices (e.g., actuators) that use the polymers. Electroactive devices with reduced operating voltages and higher energy densities may be useful for many applications.

In some embodiments, an electroactive polymer may include a deformable polymer that may be symmetric with regard to electrical charge (e.g., polydimethylsiloxane (PDMS), acrylates, etc.) or asymmetric (e.g., poled polyvinylidene fluoride (PVDF) or its copolymers such as poly (vinylidenefluoride-co-trifluoroethylene) (PVDF-TrFE)). Additional examples of polymer materials forming electroactive polymer materials may include, without limitation, styrenes, polyesters, polycarbonates, epoxies, halogenated polymers, such as PVDF, copolymers of PVDF, such as PVDF-TrFE, silicone polymers, and/or any other suitable polymer materials. Such materials may have any suitable dielectric constant or relative permittivity, such as, for example, a dielectric constant ranging from approximately 2 to approximately 30.

The physical origin of the compressive nature of electroactive polymers in the presence of an electrostatic field (E-field), being the force created between opposite electric charges, is that of the Maxwell stress, which is expressed mathematically with the Maxwell stress tensor. The level of strain or deformation induced by a given E-field is dependent on the square of the E-field strength, the dielectric constant of the electroactive polymer, and on the elastic compliance of the material in question. Compliance in this case is the change of strain with respect to stress or, equivalently, in more practical terms, the change in displacement with respect to force.

Voids

In some embodiments, the electroactive elements described herein may include voids, such as nanovoids (e.g., having a plurality of voids and/or nanoscale-sized voids in an electroactive element including an electroactive polymer or composite thereof). In some embodiments, the nanovoids may occupy at least approximately 10% (e.g., approximately 10% by volume, approximately 20% by volume, approximately 30% by volume, approximately 40% by volume, approximately 50% by volume, approximately 60% by volume, approximately 70% by volume, approximately 80% by volume, approximately 90% by volume) of the volume of the electroactive elements. The voids and/or nanovoids may be either closed- or open-celled, or a mixture thereof. If they are open-celled, the void size may be the minimum average diameter of the cell. In some embodiments, the polymer layer may include a thermoset material and/or any other suitable material having an elastic modulus of less than approximately 10 GPa (e.g., approximately 0.5 GPa, approximately 1 GPa, approximately 2 GPa, approximately 3 GPa, approximately 4 GPa, approximately 5 GPa, approximately 6 GPa, approximately 7 GPa, approximately 8 GPa, approximately 9 GPa).

The voids and/or nanovoids may be any suitable size and, in some embodiments, the voids may approach the scale of the thickness of the polymer layer in the undeformed state. For example, the voids may be between approximately 10 nm to about equal to the gap between the paired two electrodes. In some embodiments, the voids may be between approximately 10 nm and approximately 1000 nm, such as between approximately 10 and approximately 200 nm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 110 nm, approximately 120 nm, approximately 130 nm, approximately 140 nm, approximately 150 nm, approximately 160 nm, approximately 170 nm, approximately 180 nm, approximately 190 nm, approximately 200 nm, approximately 250 nm, approximately 300 nm, approximately 400 nm, approximately 500 nm, approximately 600 nm, approximately 700 nm, approximately 800 nm, approximately 900 nm, and/or approximately 1000 nm).

In some embodiments, the term "effective density," as used herein, may refer to a parameter that may be obtained using a test method where a uniformly thick layer of the elastomer may be placed between two flat and rigid circular plates. In some embodiments, the diameter of the elastomer material being compressed may be at least 100 times the thickness the elastomer material. The diameter of the elastomer material may be measured, then the plates may be pressed together to exert a pressure of at least approximately $1 \times 10^6$ Pa on the elastomer, and the diameter of the elastomer is remeasured. The effective density may be determined from an expression (DR=D_uncompressed/D_compressed), where DR may represent the effective density ratio, D_uncompressed may represent the density of the uncompressed polymer, and D_compressed may represent the density of the uncompressed polymer.

The density of voids within an electroactive element, or other dielectric material, may vary as a function of position. In some embodiments, the volume fraction of an electroactive component (or dielectric material) may vary between 10% and 60%. The structure of the voids may be interconnected (open cell) or the voids may be fully enclosed by suitable dielectric material (closed cell). The voids may be partially filled with a dielectric liquid or dielectric gas. The voids may be partially coated with a layer of suitable material. In some embodiments, a voided material (such as a porous material) may be fabricated using a templating agent, such as a material that directs the structural formation of pores or other structural elements of an electroactive element. A templating agent may be any phase of matter (solid, liquid, gas). In some embodiments, a templating agent is removed to produce a pore (or void).

Particles

In some embodiments, the electroactive elements described herein may include particles including a material having a high dielectric constant, with the particles having an average diameter between approximately 10 nm and approximately 1000 nm. In some embodiments, the material having the high dielectric constant may include barium titanate.

In some embodiments, an electroactive element may include one or more polymers, and may additionally include a plurality of particles. In some embodiments, an electroactive element may include particles of a material to assist the formation of voids, support voided regions, or both. Example particle materials include: a silicate, such as silica, including structures resulting from silica gels, fumed silica; a titanate, such as barium titanate; a metal oxide, such as a transition metal oxide, such as titanium dioxide; another oxide; composites or combinations thereof; or other particle material. The particles may have an average diameter between approximately 10 nm and approximately 1000 nm, and the particles may form branched or networked particles with average dimensions of between approximately 100 and approximately 10,000 nm.

In some embodiments, an electroactive element may include particles of a material having a high dielectric constant. In some embodiments, the particles may have an average diameter between approximately 10 nm and approximately 1000 nm. In some embodiments, the particle material may have a high dielectric constant. In some embodiments, the particle material may include a titanate, such as barium titanate ($BaTiO_3$), or other perovskite material such as other titanates.

Additionally or alternatively, any other suitable component may be added to the electroactive polymer material. $BaTiO_3$ is a ferroelectric material with a relatively high dielectric constant (e.g., a value of between approximately 500 and approximately 7000) and polarization and may be used in various electroactive devices described herein. Besides large polarizability and permittivity, large strains may also be achievable with $BaTiO_3$. Pure $BaTiO_3$ is an insulator whereas upon doping it may transform into a semiconductor in conjunction with the polymer material. In some embodiments, the particles of the materials having high dielectric constant may be included in the polymer to modify a mechanical (e.g., a Poisson's ratio) or electrical property (resistance, capacitance, etc.) of the first electroactive element or the second electroactive element.

In some embodiments, an electroactive device includes a first electrode, a second electrode and a voided polymer layer interposed between at least a portion of the area of the first and second electrode. In some embodiments, the voided polymer layer has no periodic structure on length scales greater than 10 nm and the voids have a characteristic length scale that is less than 1 micron. Voids may form a connected structure in an open cell configuration, or the voids may be surrounded, e.g., by dielectric material in a closed cell configuration. In some embodiments, a voided dielectric material may further include particles of a material with a high dielectric constant, such as a solid such as barium titanite. In some embodiments, voids may be filled with a fluid, such as a liquid or a gas, for example a dielectric liquid or a dielectric gas with high dielectric strength gas, such as a halide, in particular a fluoride such as is sulfur hexafluoride, organofluoride or the like.

Electrodes

In some embodiments, an "electrode," as used herein, may refer to a conductive material, which may be in the form of a film or a layer. The electrode may be self-healing, such that when an area of an active layer (e.g., an electroactive element) shorts out, the electrode may be able to isolate the damaged area.

In some embodiments, the electrodes (e.g., such as a first electrode, a second electrode, or any other electrode) may include a metal such as aluminum, gold, silver, tin, copper, indium, gallium, zinc, and the like. An electrode may include one or more electrically conductive materials, such as a metal, a semiconductor (such as a doped semiconductor), carbon nanotube, graphene, transparent conductive oxides (TCOs, e.g., indium tin oxide (ITO), zinc oxide (ZnO), etc.), or other electrically conducting material.

In some embodiments, electroactive devices may include paired electrodes, which allow the creation of the electrostatic field that forces constriction of the electroactive polymer. Such electrodes may include relatively thin, electrically conductive layers or elements and may be of a non-compliant or compliant nature. Any suitable materials may be utilized in the electrodes, including electrically conductive materials suitable for use in thin-film electrodes, such as, for example, aluminum, transparent conductive oxides, silver, indium, gallium, zinc, carbon nanotubes, carbon black, and/or any other suitable materials formed by vacuum deposition, spray, adhesion, and/or any other suitable technique either on a non-electroactive polymer layer or directly on the electroactive polymer surface itself. In some embodiments, the electrode or electrode layer may be self-healing, such that damage from local shorting of a circuit can be isolated. Suitable self-healing electrodes may include thin films of metals, such as, for example, aluminum.

In some embodiments, one or more electrodes may be optionally electrically interconnected, e.g., through a contact layer, to a common electrode. In some embodiments, an electroactive device may have a first common electrode, connected to a first plurality of electrodes, and a second common electrode, connected to a second plurality of electrodes. In some embodiments, electrodes (e.g., one of a first plurality of electrodes and one of a second plurality of electrodes) may be electrically isolated from each other using an insulator, such as a dielectric layer. An insulator may include a material without appreciable electrical conductivity, and may include a dielectric material, such as, for example, an acrylate or silicone polymer. In some embodiments, an electrode (or other electrical connector) may include a metal (e.g., tin, aluminum, copper, gold, silver, and the like). In some embodiments, an electrode (such as an electrical contact) or an electrical connector may include a similar material to other similar components.

In some embodiments, a first electrode may overlap (e.g., overlap in a parallel direction) at least a portion of a second electrode. The first and second electrode may be generally parallel and spaced apart. A third electrode may overlap at least a portion of either the first or second electrode. An electroactive element may include a first polymer (e.g., an elastomer material) and may be disposed between a first pair of electrodes (e.g., the first electrode and the second electrode). A second electroactive element, if used, may include a second elastomer material and may be disposed between second a pair of electrodes. In some embodiments, there may be an electrode that is common to both the first pair of electrodes and the second pair of electrodes.

In some embodiments, a common electrode may be electrically coupled (e.g., electrically contacted at an interface having a low contact resistance) to one or more other electrode(s), e.g., a second electrode and a third electrode located either side of a first electrode. In some embodiments, an electroactive device may include additional electroactive elements interleaved between electrodes, for example in a stacked configuration. For example, electrodes may form an interdigitated stack of electrodes, with alternate electrodes connected to a first common electrode and the remaining alternate electrodes connected to a second common electrode. For example, an additional electroactive element may be disposed on the other side of a first electrode. The additional electroactive element may overlap a first electroactive element. An additional electrode may be disposed abutting a surface of any additional electroactive element. In some embodiments, an electroactive device may include more (e.g., two, three, or more) such additional electroactive elements and corresponding electrodes. For example, an electroactive device may include a stack of two or more electroactive elements and corresponding electrodes. For example, an electroactive device may include between 2 electroactive elements to approximately 5, approximately 10, approximately 20, approximately 30, approximately 40, approximately 50, approximately 100, approximately 200, approximately 300, approximately 400, approximately 500, approximately 600, approximately 700, approximately 800, approximately 900, approximately 1000, approximately 2000, or greater than approximately 2000 electroactive elements.

In some embodiments, electrodes may be flexible and/or resilient and may stretch, for example elastically, when an electroactive element undergoes deformation. Electrodes may include one or more TCOs, such as indium oxide, tin oxide, indium tin oxide (ITO) and the like, graphene, carbon nanotubes, and the like. In other embodiments, for example, embodiments where electroactive devices have electroactive elements including nanovoided electroactive polymer materials, relatively rigid electrodes (e.g., electrodes including a metal such as aluminum) may be used.

In some embodiments, an electrode (e.g., the first and/or second electrode, or any other electrode) may have an electrode thickness of approximately 1 nm to approximately 100 nm, with an example thickness of approximately 10 nm to approximately 50 nm. In some embodiments, an electrode may be designed to allow healing of electrical breakdown (e.g., the electric breakdown of elastomeric polymer materials) of an electroactive element. In some embodiments, an electrode may have an electrode thickness of approximately 20 nm. In some embodiments, a common electrode may have a sloped shape, or may be a more complex shape (e.g., patterned or freeform). In some embodiments, a common electrode may be shaped to allow compression and expansion of an electroactive device during operation.

Electrode Fabrication

In some embodiments, the electrodes described herein (e.g., the first electrode, the second electrode, or any other electrode including any common electrode) may be fabricated using any suitable process. For example, electrodes may be fabricated using physical vapor deposition (PVD), chemical vapor deposition (CVD), sputtering, spray-coating, spin-coating, atomic layer deposition (ALD), and the like. In some embodiments, an electrode may be manufactured using a thermal evaporator, a sputtering system, a spray coater, a spin-coater, an ALD unit, and the like. In some embodiments, an electroactive element may be deposited directly on to an electrode. In some embodiments, an electrode may be deposited directly on to the electroactive element. In some embodiments, electrodes may be prefabricated and attached to an electroactive element. In some embodiments, an electrode may be deposited on a substrate, for example a glass substrate or flexible polymer film. In some embodiments, an electroactive element may directly abut an electrode. In some embodiments, there may be a dielectric layer, such as an insulating layer, between an electroactive element and an electrode. Any suitable combination of processes may be used.

Lens Assembly and Optical Systems

In some embodiments, the electroactive devices described herein may include or be mechanically coupled to one or more optical elements. An optical element may include a lens, mirror, prism, holographic element, beam splitter, optical filter, diffraction grating, a display, or other optical element. In some embodiments, an electroactive device, such as an actuator, may include or be mechanically coupled to an adjustable lens. An adjustable lens may include any suitable type of lens with adjustable optical properties (e.g., adjustable optical power/focal length, correcting for wavefront distortion and/or aberrations, etc.), a liquid lens, a gel lens, or other adjustable lens. For example, an adjustable lens may include a deformable exterior layer filled with an optical medium such as a liquid or a semi-solid material (e.g., a gel, a semi-solid polymer, etc.). An adjustable lens may include one or more substantially transparent materials (at wavelengths of application) that may deform and/or flow under pressure.

A deformable optical element may include a substantially transparent and elastic material. For example, a deformable optical element may include a natural or synthetic elastomer that returns to a resting state when a deforming force is removed. In some embodiments, a deformable optical element may be deformed using an electroactive device generating a directly-driven force to produce a desired optical power or other optical property, e.g., for a lens or other optical element. In some embodiments, actuation forces may be applied around a perimeter of a deformable lens and may be generally uniform or variable around the perimeter of a lens. In some embodiments, electroactive devices may be used to actuate deformable optical elements in optical assemblies (e.g., lens systems).

In some embodiments, an actuator may include a bender. In some embodiments, the term "bender," as used herein, may refer, without limitation, to an electrically-driven actuator based on a plate or beam design that converts in-plane contraction, via an applied electric field, into out-of-plane displacement. A bender or bending actuator may include an all-electroactive or composite material stack operated in a bimorph, unimorph, or multilayered monolith configuration. In some embodiments, the term "unimorph bender," as used herein, may refer, without limitation, to a beam or plate having an electroactive layer and an inactive layer, in which displacement results from contraction or expansion of the electroactive layer. In some embodiments, the term "bimorph bender," as used herein, may refer, without limitation, to a beam or plate having two electroactive layers, in which displacement results from expansion or contraction of one layer with alternate contraction or expansion of the second layer.

In some embodiments, the term "multilayer bender," as used herein, may refer, without limitation, to a multilayer stack of electroactive, electrode, and insulation layers integrated with alternating contracting and expanding electroactive layers into a monolithic bender. The piezoelectric layers in multilayer piezoelectric benders may enable high electric fields (and therefore high force and displacement) to occur at low voltages. Multilayer benders may include multiple thin piezoceramic layers, which may require lower voltages to achieve similar internal stress to bimorph and unimorph designs. Charge and voltage control in open or closed loops may also be implemented in multilayer benders, with some adjustment. In some embodiments, a control system for a multilayer bender may not require a high voltage power supply.

According to some embodiments, an actuator may be a frame-contoured ring bender and/or may include stacked or overlapping benders. Furthermore, actuator volume may be constrained to an edge region outside an optical aperture, which may include a perimeter volume of a lens, an optical element, an optical sub-assembly, etc. As noted, electroactive device(s) such as an actuator (or a set of actuators) may provide equal or varied force and displacement at discrete points or along a spatially-defined distribution at the perimeter of a lens.

In some embodiments, an electroactive device may include one or more direct-drive benders, that may include an electroactive element that is disposed between two electrodes. In such examples, methods of forming an electroactive device may involve forming electrodes and an electroactive polymer simultaneously (e.g., via coflowing, slot die coating, etc.).

In some embodiment, a lens assembly may include multiple deformable optical elements (e.g., multiple deformable lenses, such as liquid lenses), where the deformation is provided by one or more electroactive devices.

Methods of Device Fabrication

Various fabrication methods are discussed herein. Properties of the electroactive element may be varied across its spatial extent by varying one or more process parameters, such as wavelength, intensity, substrate temperature, other process temperature, gas pressure, application of additional radiation, chemical concentration gradients, chemical composition variations (e.g., to control micelle size), or other process parameter. Non-uniform void size distributions may be obtained by varying the size of sacrificial regions within an electroactive element.

Methods of forming an electroactive device include forming electrodes and electroactive elements sequentially (e.g., via vapor deposition, coating, printing, etc.) or simultaneously (e.g., via co-flowing, coextrusion, slot die coating, etc.). Alternatively, the electroactive elements may be deposited using initiated chemical vapor deposition (iCVD), where, for example, suitable monomers of the desired polymers may be used to form the desired coating. In some embodiments, monomers, oligomers, and/or prepolymers for forming the electroactive elements may optionally be mixed with a solvent and the solvent may be removed from the electroactive element during and/or following curing to form nanovoids within the electroactive element.

A method of fabricating an electroactive device may include depositing a curable material onto a first electrode, curing the deposited curable material to form an electroactive element (e.g., including a cured elastomer material) and depositing an electrically conductive material onto a surface of the electroactive element opposite the first electrode to form a second electrode. In some embodiments, the cured elastomer material may have a Poisson's ratio of approximately 0.35 or less. In some embodiments, a method may further include depositing an additional curable material onto a surface of the second electrode opposite the electroactive element, curing the deposited additional curable material to form a second electroactive element including a second cured elastomer material, and depositing an additional electrically conductive material onto a surface of the second electroactive element opposite the second electrode to form a third electrode.

In some embodiments, a method of fabricating an electroactive element may include vaporizing a curable material, or a precursor thereof, where depositing the curable material may include depositing the vaporized curable material onto the first electrode. In some embodiments, a method of fabricating an electroactive element may include printing the polymer or precursor thereof (such as a curable material) onto an electrode. In some embodiments, a method may also include combining a polymer precursor material with at least one other component to form a deposition mixture. In some embodiments, a method may include combining a curable material with particles of a material having a high dielectric constant to form a deposition mixture.

According to some embodiments, a method may include positioning a curable material between a first electrically conductive material and a second electrically conductive material. The positioned curable material may be cured to form an electroactive element including a cured elastomer material. In some embodiments, the cured elastomer material may have a Poisson's ratio of approximately 0.35 or less. In some embodiments, at least one of the first electrically conductive material or the second electrically conductive material may include a curable electrically conductive material, and the method may further include curing the at least one of the first electrically conductive material or the second electrically conductive material to form an electrode. In this example, curing the at least one of the first electrically conductive material or the second electrically conductive material may include curing the at least one of the first electrically conductive material or the second electrically conductive material during curing of the positioned curable material.

In some embodiments, a curable material and at least one of a first electrically conductive material or a second electrically conductive material may be flowable during positioning of the curable material between the first and second electrodes. A method of fabricating an electroactive device may further include flowing a curable material and at least one of the first electrically conductive material or the second electrically conductive material simultaneously onto a substrate.

In some embodiments, methods for fabricating an electroactive device (e.g., an actuator) may include masks (e.g., shadow masks) to control the patterns of deposited materials to form the electroactive device. In some embodiments, the electroactive device may be fabricated on a surface enclosed by a deposition chamber, which may be evacuated (e.g., using one or more mechanical vacuum pumps to a predetermined level such as 10-6 Torr or below). A deposition chamber may include a rigid material (e.g., steel, aluminum, brass, glass, acrylic, and the like). A surface used for deposition may include a rotating drum. In some embodiments, the rotation may generate centrifugal energy and cause the deposited material to spread more uniformly over any underlying sequentially deposited materials (e.g., electrodes, polymer elements, and the like) that are mechanically coupled to the surface. In some embodiments, the surface may be fixed and the deposition and curing systems may move relative to the surface, or both the surface, the deposition, and/or curing systems may be moving simultaneously.

In some embodiments, an electroactive device (e.g., an actuator, sensor, or the like) may be fabricated by: providing an electrically conductive layer (e.g., a first electrode) having a first surface; depositing (e.g., vapor depositing) a polymer (e.g., an electroactive polymer) or polymer precursor (such as a monomer) onto the electrode; as needed, forming a polymer such as an electroactive polymer from the polymer precursor (e.g., by curing or a similar process); and depositing another electrically conductive layer (e.g., a second electrode) onto the electroactive polymer. In some embodiments, the method may further include repeating one or more of the above to fabricate additional layers (e.g., second electroactive element, other electrodes, alternating stack of polymer layers and electrodes, and the like. An electroactive device may have a stacked configuration.

In some embodiments, an electroactive device may be fabricated by first depositing a first electrode, and then depositing a curable material (e.g., a monomer) on the first electrode (e.g., deposited using a vapor deposition process). In some embodiments, an inlet (not shown) to a deposition chamber may open and may input an appropriate monomer initiator for starting a chemical reaction. In some embodiments, "monomer," as used herein, may refer to a monomer that forms a given polymer (i.e., as part of an electroactive element). In other examples, polymerization of a polymer precursor (such as a monomer) may include exposure to electromagnetic radiation (e.g., visible, UV, x-ray or gamma radiation), exposure to other radiation (e.g., electron beams, ultrasound), heat, exposure to a chemical species (such as a catalyst, initiator, and the like, some combination thereof, and the like.

Deposited curable material may be cured with a source of radiation (e.g., electromagnetic radiation, such as UV and/or visible light) to form an electroactive element that includes a cured elastomer material, for example by photopolymerization. In some embodiments, a radiation source may include an energized array of filaments that may generate electromagnetic radiation, a semiconductor device such as light-emitting diode (LED) or semiconductor laser, other laser, fluorescence or an optical harmonic generation source, and the like. A monomer and an initiator (if used) may react upon exposure to radiation to form an electroactive element. In some embodiments, radiation may include radiation having an energy (e.g., intensity and/or photon energy) capable of breaking covalent bonds in a material. Radiation examples may include electrons, electron beams, ions (such as protons, nuclei, and ionized atoms), x-rays, gamma rays, ultraviolet visible light, or other radiation, e.g., having appropriately high energy levels. In some embodiments, the cured elastomer material may include at least one non-polymeric component in a plurality of defined regions and the method may further include removing at least a portion of the at least one non-polymeric component from the cured elastomer material to form a voided (e.g., nanovoided) polymer element.

An electrically conductive material may then be deposited onto a surface of the first electroactive element opposite a first electrode to form a second electrode. An additional curable material may be deposited onto a surface of the second electrode opposite the electroactive element. For example, the deposited additional curable material may be cured to form a second electroactive element, for example including a second cured elastomer material. In some embodiments, an additional electrically conductive material may be deposited onto a surface of the second electroactive element opposite the second electrode to form a third electrode.

In some embodiments, a deposition chamber may have an exhaust port configured to open to release at least a portion of the vapor in the chamber during and/or between one or more depositions of the materials (e.g., monomers, oligomers, monomer initiators, conductive materials, etc.). In some embodiments, a deposition chamber may be purged (e.g., with a gas or the application of a vacuum, or both) to remove a portion of the vapor (e.g., monomers, oligomers, monomer initiators, metal particles, and any resultant by-products). Thereafter, one or more of the previous steps may be repeated (e.g., for a second electroactive element, and the like). In this way, individual layers of an electroactive device may be maintained at high purity levels.

In some embodiments, the deposition of the materials (e.g., monomers, oligomers, monomer initiators, conductive materials, etc.) of the electroactive device may be performed using a deposition process, such as chemical vapor deposition (CVD), to be described further below. CVD may refer to a vacuum deposition method used to produce high-quality, high-performance, solid materials. In CVD, a substrate may be exposed to one or more precursors, which may react and/or decompose on the substrate surface to produce the desired deposit (e.g., one or more electrodes, electroactive polymers, etc.). Frequently, volatile by-products are also produced, which may be removed by gas flow through the chamber.

In some embodiments, an electroactive device may be fabricated using an atmospheric pressure CVD (APCVD) coating formation technique (e.g., CVD at atmospheric pressure). In some embodiments, an electroactive device may be fabricated using a low-pressure CVD (LPCVD) process (e.g., CVD at sub-atmospheric pressures). In some embodiments, LPCVD may make use of reduced pressures that may reduce unwanted gas-phase reactions and improve the deposited material's uniformity across the substrate. In one aspect, a fabrication apparatus may apply an ultrahigh vacuum CVD (UHVCVD) process (e.g., CVD at very low pressure, typically below approximately 10-6 Pa (equivalently, approximately 10-8 torr)).

In some embodiments, an electroactive device may be fabricated using an aerosol assisted CVD (AACVD) process (e.g., a CVD in which the precursors are transported to the electroactive device) by means of a liquid/gas aerosol, which may be generated ultrasonically or with electrospray. In some embodiments, AACVD may be used with non-volatile precursors. In some embodiments, an electroactive device may be fabricated using a direct liquid injection CVD (DLICVD) process (e.g., a CVD in which the precursors are in liquid form, for example, a liquid or solid dissolved in a solvent). Liquid solutions may be injected in a deposition chamber towards one or more injectors. The precursor vapors may then be transported to the electroactive device as in CVD. DLICVD may be used on liquid or solid precursors, and high growth rates for the deposited materials may be reached using this technique.

In some embodiments, an electroactive device may be fabricated using a hot wall CVD process (e.g., CVD in which the deposition chamber is heated by an external power source and the electroactive device is heated by radiation from the heated wall of the deposition chamber). In another aspect, an electroactive device may be fabricated using a cold wall CVD process (e.g., a CVD in which only the electroactive device is directly heated, for example, by induction, while the walls of the chamber are maintained at room temperature).

In some embodiments, an electroactive device may be fabricated using a microwave plasma-assisted CVD (MPCVD) process, where microwaves are used to enhance chemical reaction rates of the precursors. In another aspect, an electroactive device may be fabricated using a plasma-enhanced CVD (PECVD) process (e.g., CVD that uses plasma to enhance chemical reaction rates of the precursors). In some embodiments, PECVD processing may allow deposition of materials at lower temperatures, which may be useful in withstanding damage to the electroactive device or in depositing certain materials (e.g., organic materials and/or some polymers).

In some embodiments, an electroactive device may be fabricated using a remote plasma-enhanced CVD (RPECVD) process. In some embodiments, RPECVD may be similar to PECVD except that the electroactive device may not be directly in the plasma discharge region. In some embodiments, the removal of the electroactive device from the plasma region may allow for the reduction of processing temperatures down to room temperature.

In some embodiments, an electroactive device may be fabricated using an atomic-layer CVD (ALCVD) process. In some embodiments, ALCVD may deposit successive layers of different substances to produce layered, crystalline film coatings on the electroactive device.

In some embodiments, an electroactive device may be fabricated using a combustion chemical vapor deposition (CCVD) process. In some embodiments, CCVD (also referred to as flame pyrolysis) may refer to an open-atmosphere, flame-based technique for depositing high-quality thin films (e.g., layers of material ranging from fractions of a nanometer (monolayer) to several micrometers in thickness) and nanomaterials, which may be used in forming the electroactive device.

In some embodiments, an electroactive device may be fabricated using a hot filament CVD (HFCVD) process, which may also be referred to as catalytic CVD (cat-CVD) or initiated CVD (iCVD). In some embodiments, this process may use a hot filament to chemically decompose the source gases to form the materials of the electroactive device. Moreover, the filament temperature and temperature of portions of the electroactive device may be independently controlled, allowing colder temperatures for better adsorption rates at the electroactive device, and higher temperatures necessary for decomposition of precursors to free radicals at the filament.

In some embodiments, an electroactive device may be fabricated using a hybrid physical-chemical vapor deposition (HPCVD) process. HPCVD may involve both chemical decomposition of precursor gas and vaporization of a solid source to form the materials on the electroactive device.

In some embodiments, an electroactive device may be fabricated using metalorganic chemical vapor deposition (MOCVD) process (e.g., a CVD that uses metalorganic precursors) to form materials on the electroactive device. For example, an electrode may be formed on an electroactive element using this approach.

In some embodiments, an electroactive device may be fabricated using a rapid thermal CVD (RTCVD) process. This CVD process uses heating lamps or other methods to rapidly heat the electroactive device. Heating only the electroactive device rather than the precursors or chamber walls may reduce unwanted gas-phase reactions that may lead to particle formation in the electroactive device.

In some embodiments, an electroactive device may be fabricated using a photo-initiated CVD (PICVD) process. This process may use UV light to stimulate chemical reactions in the precursor materials used to make the materials for the electroactive device. Under certain conditions, PICVD may be operated at or near atmospheric pressure.

In some embodiments, electroactive devices may be fabricated by nanovoided a process including depositing a curable material (e.g., a monomer such as an acrylate or a silicone) and a solvent for the curable material onto a substrate, heating the curable material with at least a portion of the solvent remaining with the cured monomer, and removing the solvent from the cured monomer. Using this process, voids such as nanovoids may be formed in the electroactive element. In some embodiments, a flowable material (e.g., a solvent) may be combined with the curable materials (e.g., monomers and conductive materials) to create a flowable mixture that may be used for producing electroactive polymers with nanovoids. The monomers may be monofunctional or polyfunctional, or mixtures thereof. Polyfunctional monomers may be used as crosslinking agents to add rigidity or to form elastomers. Polyfunctional monomers may include difunctional materials such as bisphenol fluorene (EO) diacrylate, trifunctional materials such as trimethylolpropane triacrylate (TMPTA), and/or higher functional materials. Other types of monomers may be used, including, for example, isocyanates, and these may be mixed with monomers with different curing mechanisms.

In some embodiments, the flowable material may be combined (e.g., mixed) with a curable material (e.g., a monomer). In some embodiments, a curable material may be combined with at least one non-curable component (e.g., particles of a material having a high dielectric constant) to form a mixture including the curable material and the at least one non-curable component, for example, on an electrode (e.g., a first electrode or a second electrode) of the electroactive device. Alternatively, the flowable material (e.g., solvent) may be introduced into a vaporizer to deposit (e.g., via vaporization or, in alternative embodiments, via printing) a curable material onto an electrode. In some embodiments, a flowable material (e.g., solvent) may be deposited as a separate layer either on top or below a curable material (e.g., a monomer) and the solvent and curable material may be allowed to diffuse into each other before being cured by the source of radiation to generate an electroactive polymer having nanovoids. In some embodiments, after the curable material is cured, the solvent may be allowed to evaporate before another electroactive polymer or another electrode is formed. In some embodiments, the evaporation of the solvent may be accelerated by the application of heat to the surface with a heater, which may, for example, by disposed within a drum forming surface and/or any other suitable location, or by reducing the pressure of the solvent above the substrate using a cold trap (e.g., a device that condenses vapors into a liquid or solid), or a combination thereof. Isolators (not shown) may be added to the apparatus to prevent, for example, the solvent vapor from interfering with the radiation source or the electrode source.

In some embodiments, the solvent may have a vapor pressure that is similar to at least one of the monomers being evaporated. The solvent may dissolve both the monomer and the generated electroactive polymer, or the solvent may dissolve only the monomer. Alternatively, the solvent may have low solubility for the monomer, or plurality of monomers if there is a mixture of monomers being applied. Furthermore, the solvent may be immiscible with at least one of the monomers and may at least partially phase separate when condensed on the substrate.

In some embodiments, there may be multiple vaporizers, with each of the multiple vaporizers applying a different material, including solvents, non-solvents, monomers, and/or ceramic precursors such as tetraethyl orthosilicate and water, and optionally a catalyst for forming a sol-gel such as HCl or ammonia.

In some embodiments, a method of generating a NVP for use in connection with an electroactive device (such as electroactive devices described variously herein) may include co-depositing a monomer or mixture of monomers, a surfactant, and a nonsolvent material associated with the monomer(s) which is compatible with the surfactant. In various examples, the monomer(s) may include, but not be limited to, ethyl acrylate, butyl acrylate, octyl acrylate, ethoxy ethyl acrylate, 2-chloroethyl vinyl ether, chloromethyl acrylate, methacrylic acid, allyl glycidyl ether, and/or N-methylol acrylamide. Other curing agents such as polyamines, higher fatty acids or their esters, and/or sulfur may be used as the monomer(s). In some aspects, the surfactant may be ionic or non-ionic (for example SPAN 80, available from Sigma-Aldrich Company). In another aspect, the non-solvent material may include organic and/or inorganic non-solvent materials. For instance, the non-solvent material may include water or a hydrocarbon or may include a highly polar organic compound such as ethylene glycol. As noted, the monomer or monomers, non-solvent, and surfactant may be co-deposited. Alternatively, the monomer or monomers, non-solvent, and/or surfactant may be deposited sequentially. In one aspect, a substrate temperature may be controlled to generate and control one or more properties of the resulting emulsion generated by co-depositing or sequentially depositing the monomer or monomers, non-solvent, and surfactant. The substrate may be treated to prevent destabilization of the emulsion. For example, an aluminum layer may be coated with a thin polymer layer made by depositing a monomer followed by curing the monomer.

As discussed throughout the instant disclosure, the disclosed devices, systems, and methods may provide one or more advantages over conventional devices, systems, and methods. For example, in contrast to prior devices, the electroactive devices presented herein may include electroactive elements that achieve substantially uniform strain in the presence of an electrostatic field produced by a potential difference between paired electrodes, permitting the electroactive devices to achieve, for example, improvements in both energy density and specific power density. Such uniform strain may reduce or eliminate unwanted deformations in the electroactive elements and may result in greater overall deformation, such as compression, of the electroactive elements, providing a greater degree of movement of surface regions of the electroactive elements while requiring a lower amount of energy to provide such deformation. The electroactive elements may include polymer materials having nanovoided regions that allow for additional compression in the presence of a voltage gradient in comparison to non-voided materials. Additionally, an electroactive device may be formed in a stacked structure having a plurality of electroactive elements that are layered with multiple electrodes, enabling the plurality of electroactive elements to be actuated in conjunction with each other in a single device that may undergo a more substantial degree of deformation (e.g., compression and/or expansion) in comparison to an electroactive device having a single electroactive element or layer.

Electroactive devices described and shown herein may be utilized in any suitable technologies, without limitation. For example, such electroactive devices may be utilized as mechanical actuators to actuate movement of adjacent components. In at least one embodiment, the disclosed electroactive devices may be incorporated into optical systems such as adjustable lenses (e.g., fluid-filled lenses) to actuate movement of one or more optical layers. Such actuation may, for example, allow for selected movement of lens layers of an adjustable lens, resulting in deformation of the lens layers to adjust optical characteristics (e.g., focal point, spherical correction, cylindrical correction, axial correction, etc.) of the adjustable lens. In some embodiments, electroactive devices as disclosed herein may be utilized as actuators in micromechanical apparatuses, such as microelectromechanical devices. Additionally or alternatively, electroactive devices may be used for converting mechanical energy to electrical energy for use in energy harvesting systems and/or sensor apparatuses.

Application to Artificial Reality Systems

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 900 in FIG. 9. Other artificial reality systems may include a NED that also provides visibility into the real world (e.g., augmented-reality system 1000 in FIG. 10) or that visually immerses a user in an artificial reality (e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
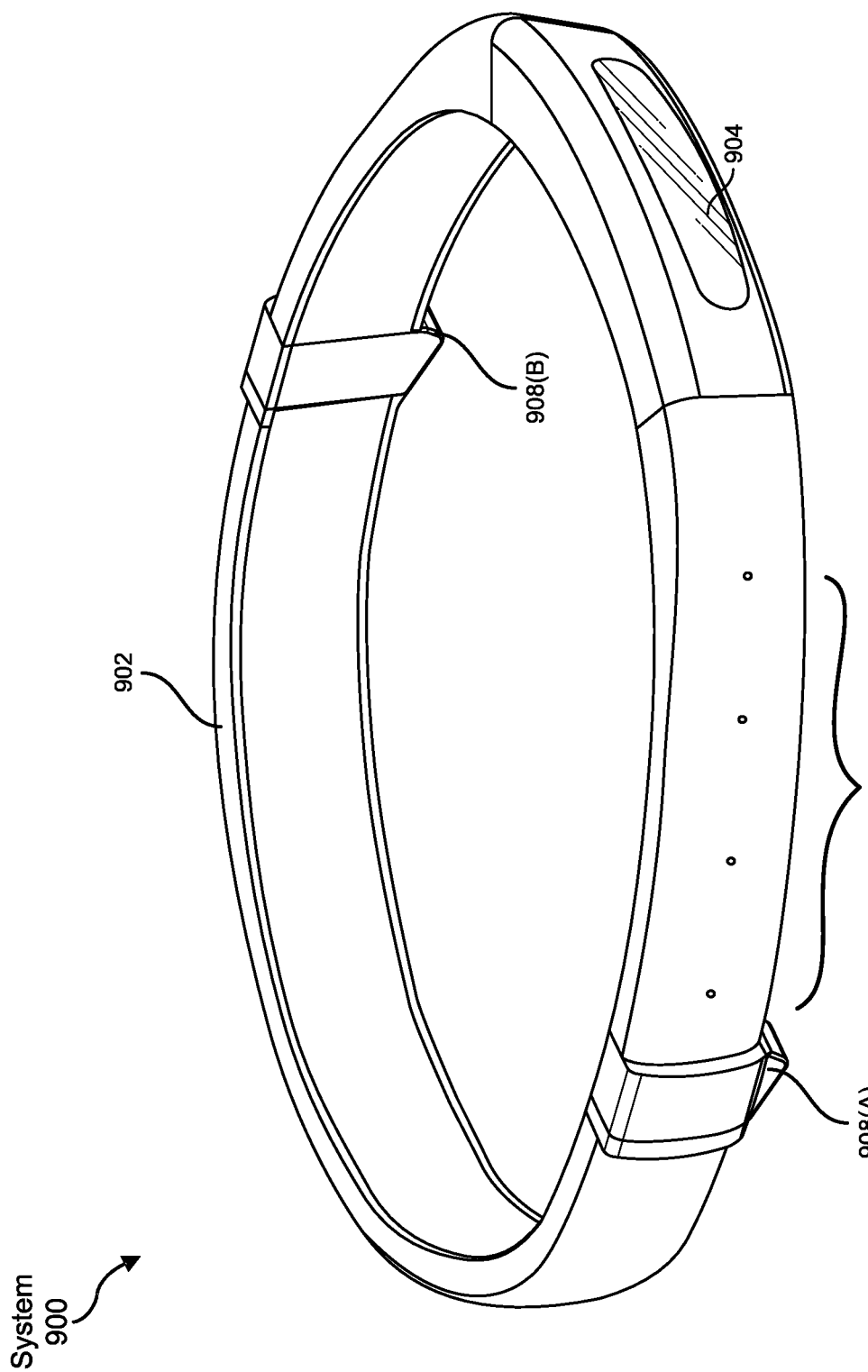
FIG. 9 is an illustration of an exemplary artificial-reality headband that may be used in connection with embodiments of this disclosure.

Turning to FIG. 9, augmented-reality system 900 generally represents a wearable device dimensioned to fit about a body part (e.g., a head) of a user. As shown in FIG. 9, system 900 may include a frame 902 and a camera assembly 904 that is coupled to frame 902 and configured to gather information about a local environment by observing the local environment. Augmented-reality system 900 may also include one or more audio devices, such as output audio transducers 908(A) and 908(B) and input audio transducers 910. Output audio transducers 908(A) and 908(B) may provide audio feedback and/or content to a user, and input audio transducers 910 may capture audio in a user's environment.

As shown, augmented-reality system 900 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 900 may not include a NED, augmented-reality system 900 may include other types of screens or visual feedback devices (e.g., a display screen integrated into a side of frame 902).

Figure 10:
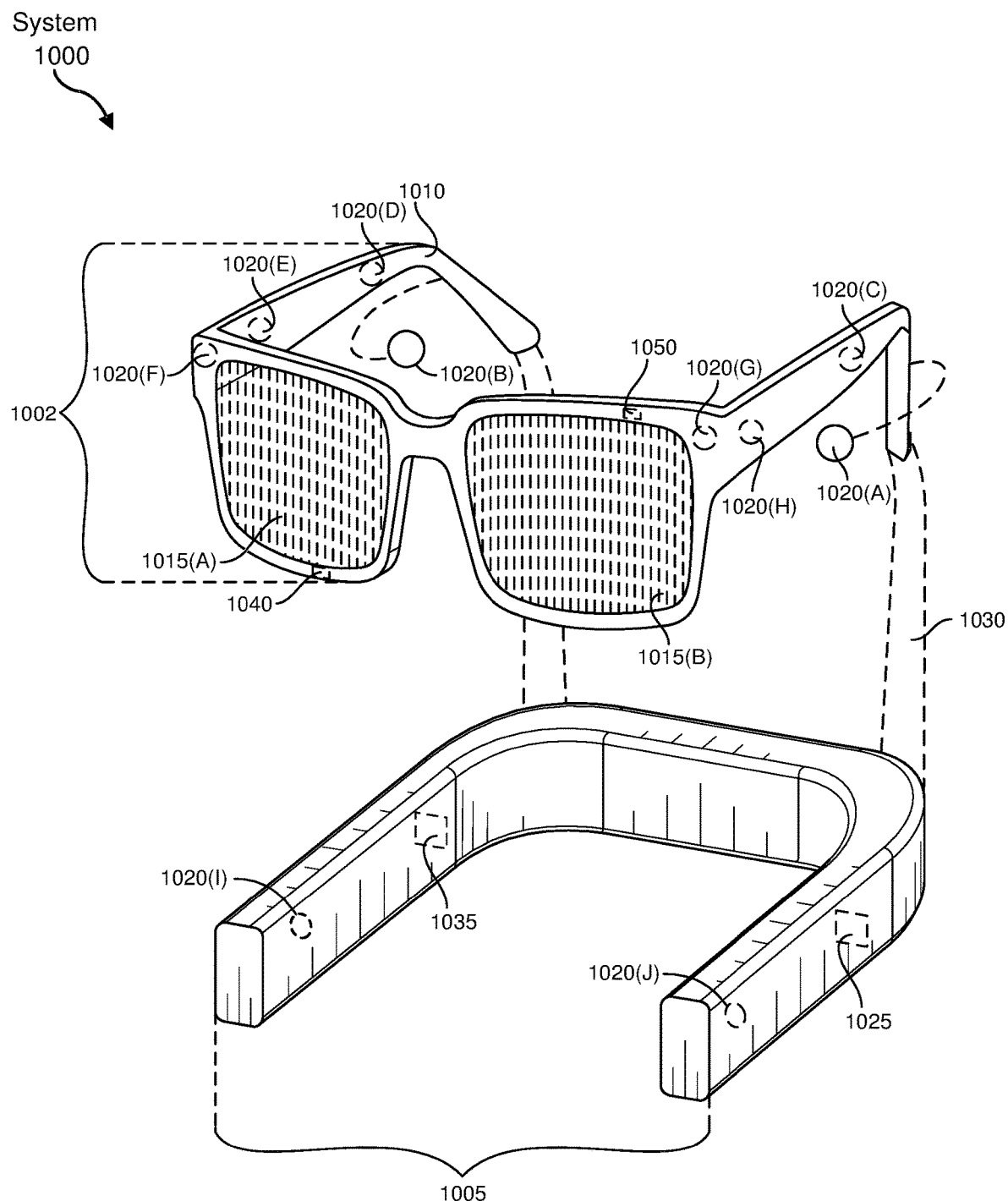
FIG. 10 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent a position sensor, an inertial measurement unit (IMU), a depth camera assembly, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

Augmented-reality system 1000 may also include a microphone array with a plurality of acoustic transducers 1020(A)-1020(J), referred to collectively as acoustic transducers 1020. Acoustic transducers 1020 may be transducers that detect air pressure variations induced by sound waves. Each acoustic transducer 1020 may be configured to detect sound and convert the detected sound into an electronic format (e.g., an analog or digital format). The microphone array in FIG. 10 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(I) and 1020(J), which may be positioned on a corresponding neckband 1005.

In some embodiments, one or more of acoustic transducers 1020(A)-(F) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by the controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer, or some combination thereof.

Acoustic transducers 1020(A) and 1020(B) may be positioned on different parts of the user's ear, such as behind the pinna or within the auricle or fossa. Or, there may be additional acoustic transducers on or surrounding the ear in addition to acoustic transducers 1020 inside the ear canal. Having an acoustic transducer positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments, acoustic transducers 1020(A) and 1020(B) may be connected to augmented-reality system 1000 via a wireless connection (e.g., a Bluetooth connection). In still other embodiments, acoustic transducers 1020(A) and 1020(B) may not be used at all in conjunction with augmented-reality system 1000.

Acoustic transducers 1020 on frame 1010 may be positioned along the length of the temples, across the bridge, above or below display devices 1015(A) and 1015(B), or some combination thereof. Acoustic transducers 1020 may be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers and other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof. Furthermore, Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(I) and 1020(J)) that are part of the microphone array (or potentially form their own microphone subarray). Neckband 1005 may also include a controller 1025 and a power source 1035.

Acoustic transducers 1020(I) and 1020(J) of neckband 1005 may be configured to detect sound and convert the detected sound into an electronic format (analog or digital). In the embodiment of FIG. 10, acoustic transducers 1020(I) and 1020(J) may be positioned on neckband 1005, thereby increasing the distance between the neckband acoustic transducers 1020(I) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1100 and/or virtual-reality system 1100 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 900, augmented-reality system 1000, and/or virtual-reality system 1100 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 9 and 11, output audio transducers 908(A), 908(B), 1106(A), and 1106(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 910 may include condenser microphones, dynamic microphones, ribbon microphones, and/or any other type or form of input transducer. In some embodiments, a single transducer may be used for both audio input and audio output.

Figure 11:
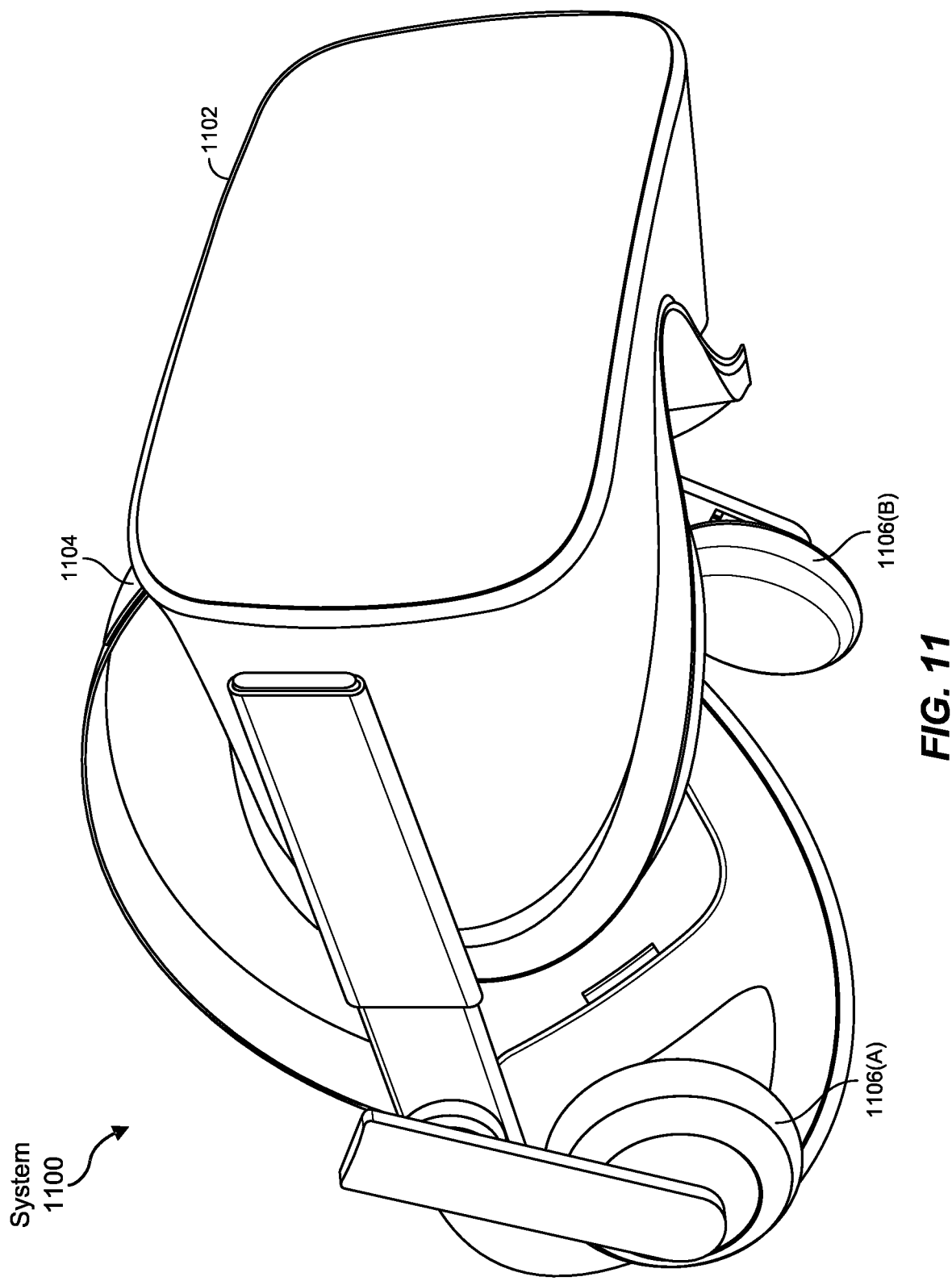
FIG. 11 is an illustration of an exemplary virtual-reality headset that may be used in connection with embodiments of this disclosure.

While not shown in FIGS. 9-11, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 900, 1000, and 1100 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 12:
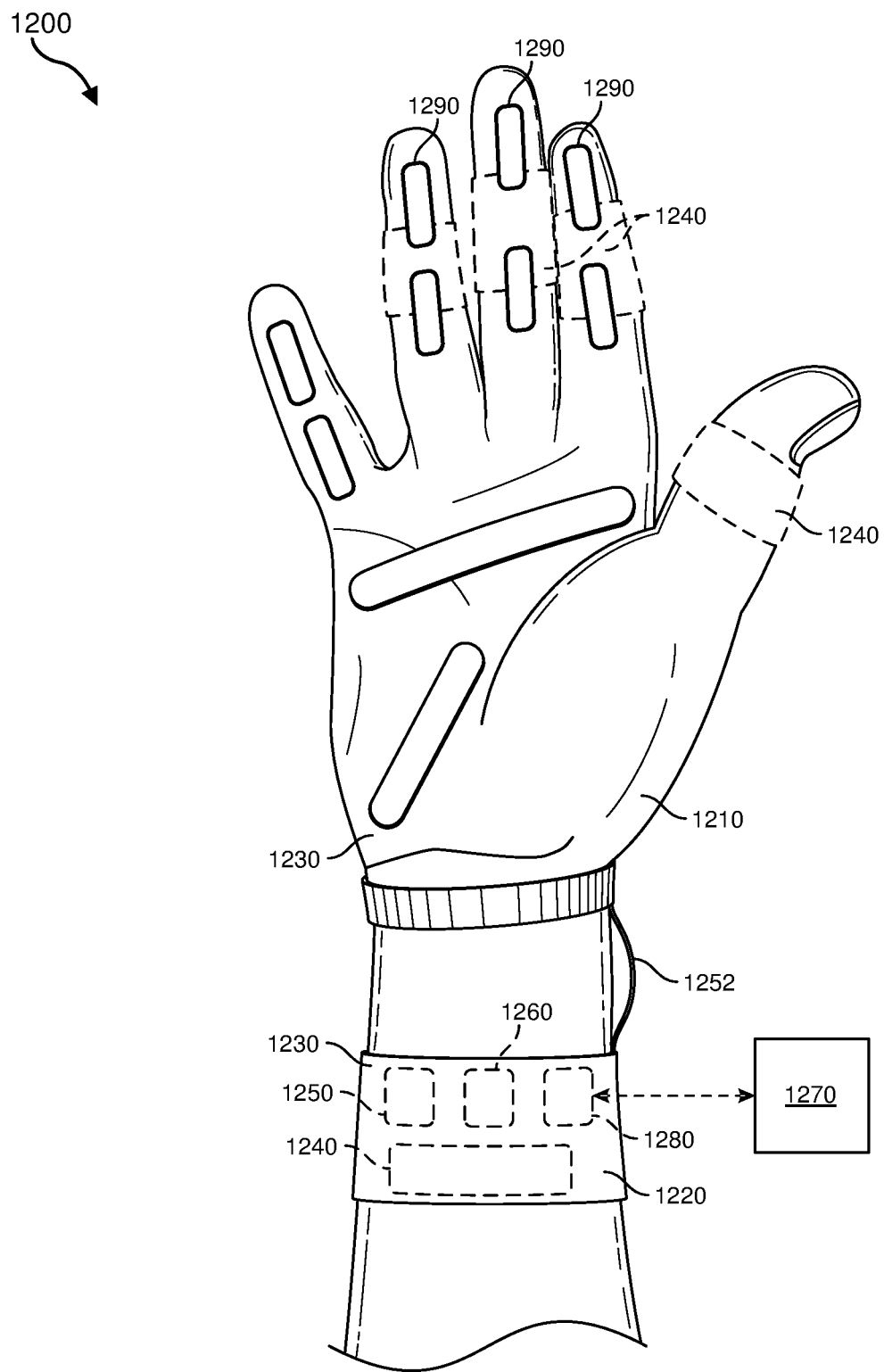
FIG. 12 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 12 illustrates a vibrotactile system 1200 in the form of a wearable glove (haptic device 1210) and wristband (haptic device 1220). Haptic device 1210 and haptic device 1220 are shown as examples of wearable devices that include a flexible, wearable textile material 1230 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1240 may be positioned at least partially within one or more corresponding pockets formed in textile material 1230 of vibrotactile system 1200. Vibrotactile devices 1240 may be positioned in locations to provide a vibrating sensation (e.g., haptic feedback) to a user of vibrotactile system 1200. For example, vibrotactile devices 1240 may be positioned to be against the user's finger(s), thumb, or wrist, as shown in FIG. 12. Vibrotactile devices 1240 may, in some examples, be sufficiently flexible to conform to or bend with the user's corresponding body part(s).

A power source 1250 (e.g., a battery) for applying a voltage to the vibrotactile devices 1240 for activation thereof may be electrically coupled to vibrotactile devices 1240, such as via conductive wiring 1252. In some examples, each of vibrotactile devices 1240 may be independently electrically coupled to power source 1250 for individual activation. In some embodiments, a processor 1260 may be operatively coupled to power source 1250 and configured (e.g., programmed) to control activation of vibrotactile devices 1240.

Vibrotactile system 1200 may be implemented in a variety of ways. In some examples, vibrotactile system 1200 may be a standalone system with integral subsystems and components for operation independent of other devices and systems. As another example, vibrotactile system 1200 may be configured for interaction with another device or system 1270. For example, vibrotactile system 1200 may, in some examples, include a communications interface 1280 for receiving and/or sending signals to the other device or system 1270. The other device or system 1270 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1280 may enable communications between vibrotactile system 1200 and the other device or system 1270 via a wireless (e.g., Wi-Fi, Bluetooth, cellular, radio, etc.) link or a wired link. If present, communications interface 1280 may be in communication with processor 1260, such as to provide a signal to processor 1260 to activate or deactivate one or more of the vibrotactile devices 1240.

Vibrotactile system 1200 may optionally include other subsystems and components, such as touch-sensitive pads 1290, pressure sensors, motion sensors, position sensors, lighting elements, and/or user interface elements (e.g., an on/off button, a vibration control element, etc.). During use, vibrotactile devices 1240 may be configured to be activated for a variety of different reasons, such as in response to the user's interaction with user interface elements, a signal from the motion or position sensors, a signal from the touch-sensitive pads 1290, a signal from the pressure sensors, a signal from the other device or system 1270, etc.

Although power source 1250, processor 1260, and communications interface 1280 are illustrated in FIG. 12 as being positioned in haptic device 1220, the present disclosure is not so limited. For example, one or more of power source 1250, processor 1260, or communications interface 1280 may be positioned within haptic device 1210 or within another wearable textile.

Figure 13:
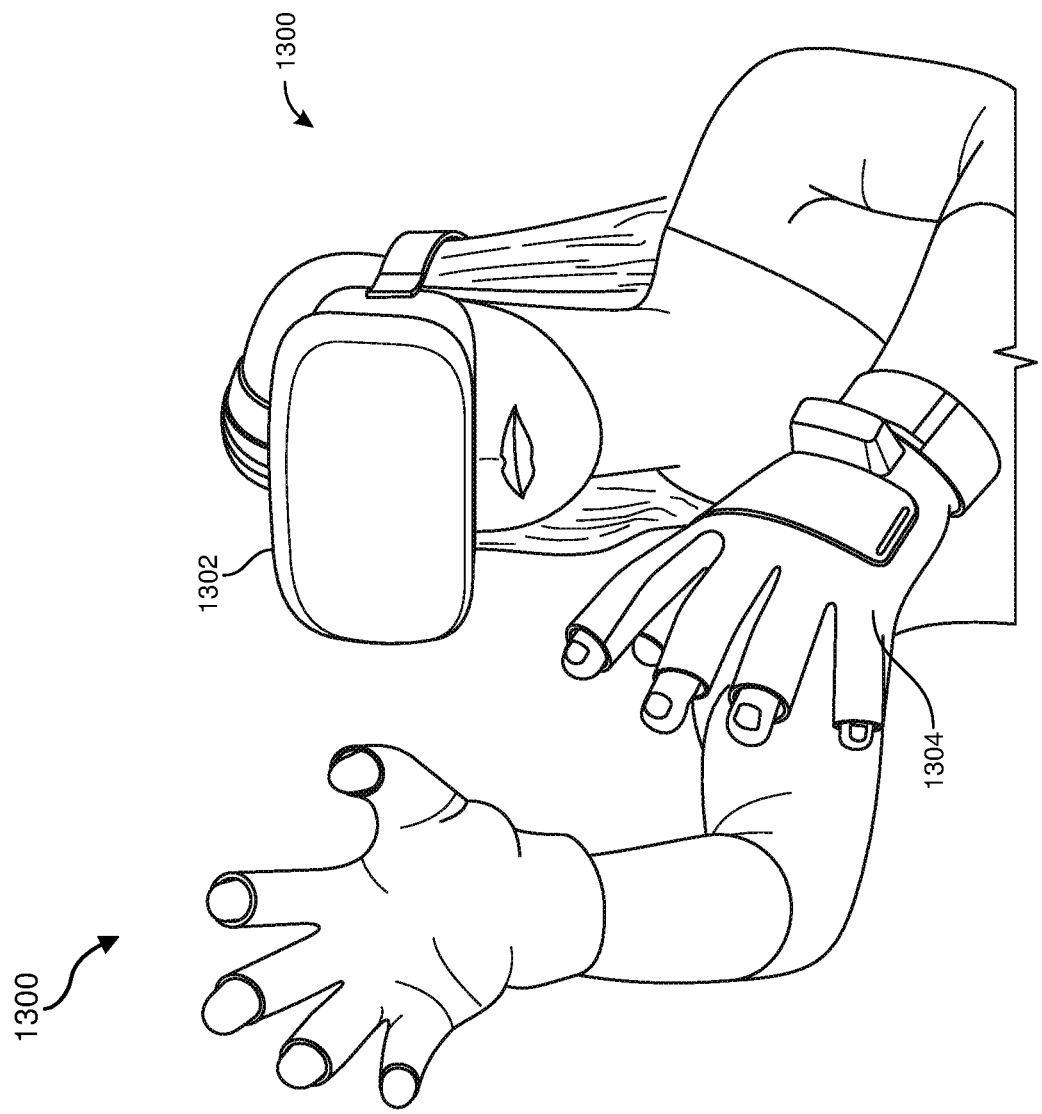
FIG. 13 is an illustration of an exemplary virtual-reality environment according to embodiments of this disclosure.

Haptic wearables, such as those shown in and described in connection with FIG. 12, may be implemented in a variety of types of artificial-reality systems and environments. FIG. 13 shows an example artificial reality environment 1300 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 1302 generally represents any type or form of virtual-reality system, such as virtual-reality system 1100 in FIG. 11. Haptic device 1304 generally represents any type or form of wearable device, worn by a use of an artificial reality system, that provides haptic feedback to the user to give the user the perception that he or she is physically engaging with a virtual object. In some embodiments, haptic device 1304 may provide haptic feedback by applying vibration, motion, and/or force to the user. For example, haptic device 1304 may limit or augment a user's movement. To give a specific example, haptic device 1304 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1304 to send action requests to a console. Examples of action requests include, without limitation, requests to start an application and/or end the application and/or requests to perform a particular action within the application.

Figure 14:
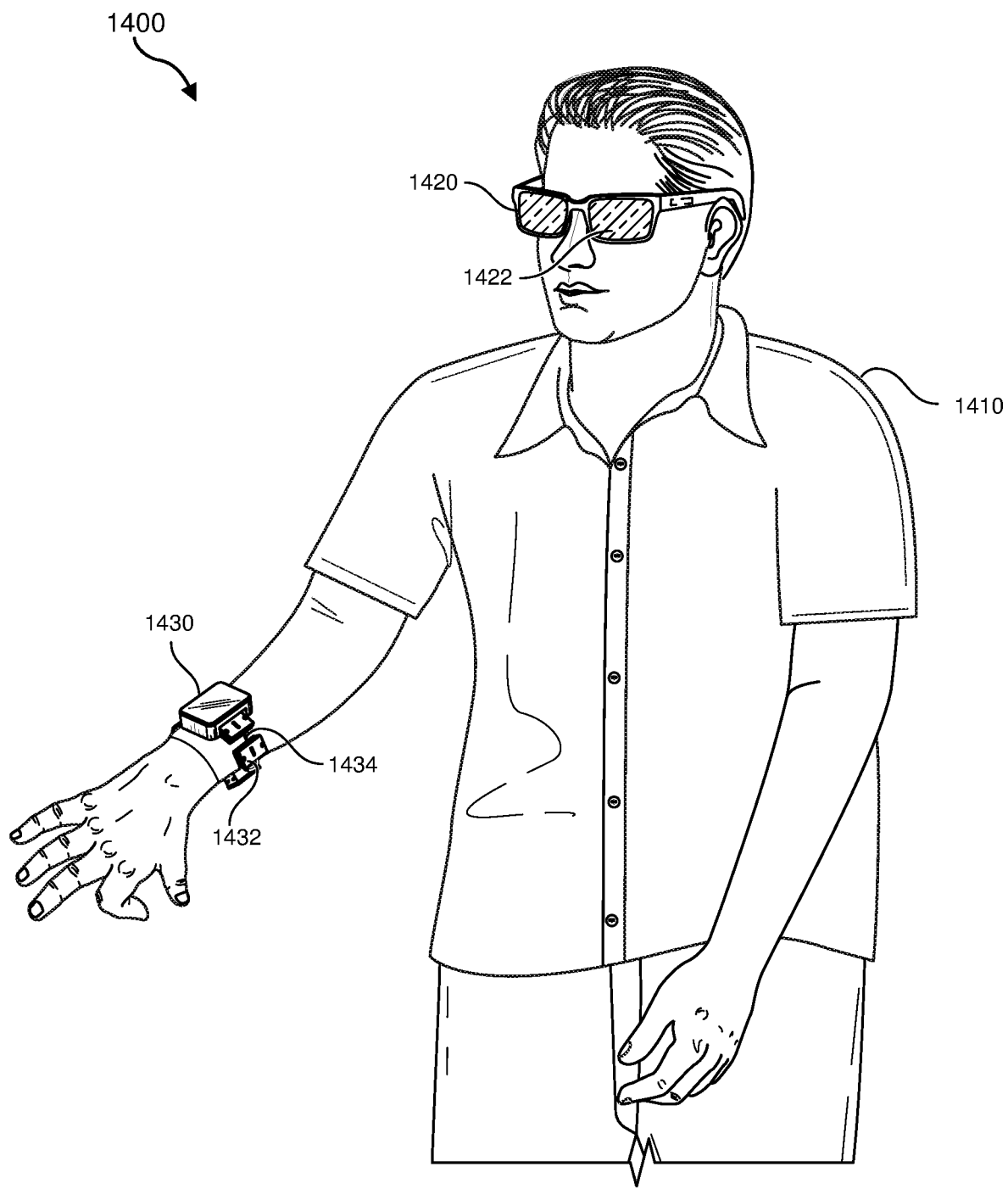
FIG. 14 is an illustration of an exemplary augmented-reality environment according to embodiments of this disclosure Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

While haptic interfaces may be used with virtual-reality systems, as shown in FIG. 13, haptic interfaces may also be used with augmented-reality systems, as shown in FIG. 14. FIG. 14 is a perspective view a user 1410 interacting with an augmented-reality system 1400. In this example, user 1410 may wear a pair of augmented-reality glasses 1420 that have one or more displays 1422 and that are paired with a haptic device 1430. Haptic device 1430 may be a wristband that includes a plurality of band elements 1432 and a tensioning mechanism 1434 that connects band elements 1432 to one another.

One or more of band elements 1432 may include any type or form of actuator suitable for providing haptic feedback. For example, one or more of band elements 1432 may be configured to provide one or more of various types of cutaneous feedback, including vibration, force, traction, texture, and/or temperature. To provide such feedback, band elements 1432 may include one or more of various types of actuators. In one example, each of band elements 1432 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1210, 1220, 1304, and 1430 may include any suitable number and/or type of haptic transducer, sensor, and/or feedback mechanism. For example, haptic devices 1210, 1220, 1304, and 1430 may include one or more mechanical transducers, piezoelectric transducers, and/or fluidic transducers. Haptic devices 1210, 1220, 1304, and 1430 may also include various combinations of different types and forms of transducers that work together or independently to enhance a user's artificial-reality experience. In one example, each of band elements 1432 of haptic device 1430 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A haptic feedback system, comprising:
   an array of electroactive devices, each electroactive device of the array comprising:
   a first electrode;
   a second electrode; and
   a patterned electroactive polymer element disposed between the first electrode and the second electrode, the patterned electroactive polymer element comprising a nanovoided polymer material that is mechanically deformable in response to an electric field generated by a potential difference between the first electrode and the second electrode, the nanovoided polymer material including a plurality of nanovoids; and
   control circuitry electronically coupled to the array, the control circuitry configured to apply a voltage to at least one of the first electrode or the second electrode using a matrix addressing technique, wherein:
   the first electrode comprises a first electrode line of a plurality of first electrode lines coupled to one side of the patterned electroactive polymer element;
   the second electrode comprises a second electrode line of a plurality of second electrode lines coupled to an opposing side of the patterned electroactive polymer element;
   the plurality of first electrode lines includes an arrangement of parallel straight electrodes;
   the plurality of second electrode lines is perpendicular to the plurality of first electrode lines;
   at least one electroactive device of the array is configured to provide a combined displacement from the patterned electroactive polymer element and at least one additional electroactive polymer element overlapping and stacked onto the patterned electroactive polymer element; and
   the plurality of nanovoids has a non-uniform nanovoid distribution within the nanovoided polymer material of the at least one electroactive device, providing a non-uniform electroactive response including a surface curvature of the at least one electroactive device in response to the electric field.

2. The haptic feedback system of claim 1, wherein:
a deformation of the patterned electroactive polymer element by an external force produces a change in at least one parameter between the first electrode and the second electrode; and
the control circuitry is configured to detect the change in the at least one parameter.

3. The haptic feedback system of claim 2, wherein each electroactive device of the array is configured to operate as at least one of a touch sensor element or a haptic feedback element.

4. The haptic feedback system of claim 1, wherein:
the at least one electroactive device of the array comprises between 1 and 10,000 additional electroactive polymer elements overlapping the patterned electroactive polymer element; and
each of the additional electroactive polymer elements is disposed between a pair of overlapping electrodes.

5. The haptic feedback system of claim 1, wherein the control circuitry is configured to apply the voltage to the electroactive devices of the array based on at least one of a time-domain multiplexing technique, a frequency-domain multiplexing technique, or a code-division multiplexing technique.

6. The haptic feedback system of claim 1, wherein the nanovoided polymer material comprises an elastomeric polymer.

7. The haptic feedback system of claim 1, wherein:
the patterned electroactive polymer element comprises a contiguous sheet; and
the array of electroactive devices includes rectangular or square electroactive devices.

8. The haptic feedback system of claim 1, wherein at least one of the first electrode or the second electrode comprises at least one of a metal, a metal mesh, metal nanowires, carbon nanotubes, transparent conducting oxides, conductive polymers, or graphene.

9. The haptic feedback system of claim 1, wherein:
at least one electroactive device of the array has an area between 0.25 square micrometers and 225 square centimeters; and
a spacing between at least two electroactive devices of the array is between 0.5 micrometers and 15 centimeters.

10. The haptic feedback system of claim 1, further comprising a flexible material covering at least a portion of the array, the flexible material comprising at least one of a glass or a polymer.

11. The haptic feedback system of claim 1, further comprising a divider material disposed between at least two electroactive devices of the array, the divider material comprising at least one of an enclosed gas, a polymer, an aerogel, or an encapsulant.

12. The haptic feedback system of claim 1, wherein at least a portion of the array overlaps a display area of a display, the display comprising at least one of a liquid crystal display, a light-emitting diode display, a micro-light-emitting diode display, an organic light-emitting diode display, or a liquid crystal on silicon display.

13. The haptic feedback system of claim 1, wherein a mechanical deformation of the nanovoided polymer material in response to the electric field comprises compression or expansion of the nanovoided polymer material.

14. A touch sensor system, comprising:
an array of electroactive devices, each electroactive device of the array comprising:
a first electrode provided by one of a plurality of first electrode lines;
a second electrode provided by one of a plurality of second electrode lines; and
a patterned electroactive polymer element disposed between the first electrode and the second electrode, the patterned electroactive polymer element comprising a nanovoided polymer material that is deformable in response to application of an external force so as to produce a change in at least one parameter between the first electrode and the second electrode, the nanovoided polymer material including a plurality of nanovoids; and
control circuitry electronically coupled to the array, the control circuitry configured to:
apply a voltage to at least one of the first electrode or the second electrode using matrix addressing of the plurality of first electrode lines and the plurality of second electrode lines; and
detect the change in the at least one parameter between the first electrode and the second electrode, wherein:
the plurality of first electrode lines includes an arrangement of parallel straight electrodes;
the plurality of second electrode lines is perpendicular to the plurality of first electrode lines;
the patterned electroactive polymer element is further mechanically deformable in response to an electric field generated by a potential difference between the first electrode and the second electrode;
at least one electroactive device of the array is configured to provide a combined displacement arising from the patterned electroactive polymer element and at least one additional electroactive polymer element overlapping and stacked onto the patterned electroactive polymer element; and
the plurality of nanovoids has a non-uniform nanovoid distribution within the nanovoided polymer material of the at least one electroactive device, providing a non-uniform electroactive response including a surface curvature of the at least one electroactive device in response to the electric field.

15. The touch sensor system of claim 14, wherein the at least one parameter comprises at least one of a resistance, a capacitance, or an inductance.

16. The touch sensor system of claim 14, further comprising a flexible material covering at least a portion of the array, wherein the external force is applied to the patterned electroactive polymer element via the flexible material.

17. The touch sensor system of claim 14, wherein:
at least one electroactive device of the array comprises between 1 and 10,000 additional electroactive polymer elements overlapping the patterned electroactive polymer element; and
each of the additional electroactive polymer elements is disposed between a pair of overlapping electrodes.

18. A method, comprising:
applying voltages to an array of electroactive devices using a matrix addressing technique, each electroactive device of the array comprising:
a first electrode provided by one of a plurality of first electrode lines;
a second electrode provided by one of a plurality of second electrode lines; and
a patterned electroactive polymer element disposed between the first electrode and the second electrode, the patterned electroactive polymer element comprising a nanovoided polymer material, the nanovoided polymer material including a plurality of nanovoids;

detecting a change in at least one parameter between the first electrode and the second electrode of each of a set of one or more electroactive devices of the array; and determining that the set of one or more electroactive devices has been deformed by an external force based on the detected change in the at least one parameter, wherein the plurality of first electrode lines includes an arrangement of parallel straight electrodes;

the plurality of second electrode lines is perpendicular to the plurality of first electrode lines;

at least one electroactive device of the array is configured to provide a combined displacement from the patterned electroactive polymer element and at least one additional electroactive polymer element overlapping and stacked onto the patterned electroactive polymer element; and the plurality of nanovoids has a non-uniform nanovoid distribution within the nanovoided polymer material of the at least one electroactive device, providing a non-uniform electroactive response including a surface curvature of the at least one electroactive device in response to an electric field applied between the first electrode and the second electrode.

19. The method of claim 18, further comprising increasing a potential difference between the first electrode and the second electrode of each of an additional set of one or more electroactive devices of the array so as to mechanically deform the patterned electroactive polymer element in each of the additional set of one or more electroactive devices.

* * * * *